United States Patent
Lee et al.

(10) Patent No.: US 11,683,798 B2
(45) Date of Patent: Jun. 20, 2023

(54) DATA SIGNAL ACQUISITION METHOD BY TERMINAL IN WIRELESS COMMUNICATION SYSTEM AND APPARATUS FOR SUPPORTING SAME

(71) Applicant: LG ELECTRONICS INC., Seoul (KR)

(72) Inventors: Kilbom Lee, Seoul (KR); Jiwon Kang, Seoul (KR); Jonghyun Park, Seoul (KR)

(73) Assignee: LG ELECTRONICS INC., Seoul (KR)

(*) Notice: Subject to any disclaimer, the term of this patent is extended or adjusted under 35 U.S.C. 154(b) by 300 days.

(21) Appl. No.: 16/980,337

(22) PCT Filed: Apr. 15, 2019

(86) PCT No.: PCT/KR2019/004490
§ 371 (c)(1),
(2) Date: Sep. 11, 2020

(87) PCT Pub. No.: WO2019/199143
PCT Pub. Date: Oct. 17, 2019

(65) Prior Publication Data
US 2021/0045141 A1    Feb. 11, 2021

(30) Foreign Application Priority Data
Apr. 13, 2018   (KR) .................. 10-2018-0043013

(51) Int. Cl.
*H04W 72/00*   (2023.01)
*H04W 72/1273*  (2023.01)
*H04W 72/23*   (2023.01)

(52) U.S. Cl.
CPC ....... *H04W 72/1273* (2013.01); *H04W 72/23* (2023.01)

(58) Field of Classification Search
CPC .................... H04W 72/1273; H04W 72/1289
See application file for complete search history.

(56) References Cited

U.S. PATENT DOCUMENTS

2018/0042028 A1   2/2018  Nam et al.
2019/0297637 A1*  9/2019  Liou .................. H04W 72/1273
(Continued)

OTHER PUBLICATIONS

Qualcomm Incorporated, "Remaining Details on QCL," 3GPP TSG-RAN WG1 #92bis, R1-1804796, Apr. 2018, 12 pages.
(Continued)

*Primary Examiner* — Khaled M Kassim
*Assistant Examiner* — Zhaohui Yang
(74) *Attorney, Agent, or Firm* — Lee Hong Degerman Kang Waimey

(57) ABSTRACT

Disclosed are a method for acquiring a data signal by a terminal in a wireless communication system and an apparatus for supporting same. According to an embodiment applicable to the present disclosure, a terminal can receive configuration information on a plurality of control resource sets (CORESETs), and on the basis of a method suggested in the present disclosure, can acquire a data signal from a physical downlink shared channel scheduled by downlink control information received via one CORESET among the plurality of CORESETs.

7 Claims, 21 Drawing Sheets

(56) References Cited

U.S. PATENT DOCUMENTS

2021/0153185 A1* 5/2021 Schober ................ H04L 1/1621
2021/0159966 A1* 5/2021 Xi ......................... H04L 5/0023

OTHER PUBLICATIONS

ASUSTeK, "Remaining issues on beam management," 3GPP TSG-RAN WG1 #92bis, R1-1804035, Apr. 2018, 7 pages.
ZTE, Sanechips, "Remaining issues on beam management," 3GPP TSG-RAN WG1 #92bis, R1-1803908, Apr. 2018, 8 pages.
Samsung, "On Beam Management, Measurement and Reporting," 3GPP TSG-RAN WG1 #91, R1-1720290, Dec. 2017, 17 pages.
PCT International Application No. PCT/KR2019/004490, Written Opinion of the International Searching Authority dated Aug. 6, 2019, 18 pages.

* cited by examiner (a)

(b)

DATA SIGNAL ACQUISITION METHOD BY TERMINAL IN WIRELESS COMMUNICATION SYSTEM AND APPARATUS FOR SUPPORTING SAME

CROSS-REFERENCE TO RELATED APPLICATIONS

This application is the National Stage filing under 35 U.S.C. 371 of International Application No. PCT/KR2019/004490, filed on Apr. 15, 2019, which claims the benefit of earlier filing date and right of priority to Korean Application No. 10-2018-0043013, filed on Apr. 13, 2018, the contents of which are all hereby incorporated by reference herein in their entirety.

TECHNICAL FIELD

The present disclosure relates to a wireless communication system and, more particularly, to a method for a terminal to obtain a data signal in a wireless communication system and apparatus for supporting the same.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

As a number of communication devices have required higher communication capacity, the necessity of the mobile broadband communication much improved than the existing radio access technology (RAT) has increased. In addition, massive machine type communications (MTC) capable of providing various services at anytime and anywhere by connecting a number of devices or things to each other has been considered in the next generation communication system. Moreover, a communication system design capable of supporting services/user equipments (UEs) sensitive to reliability and latency has been discussed.

As described above, the introduction of the next generation RAT considering the enhanced mobile broadband communication, massive MTC, ultra-reliable and low latency communication (URLLC), and the like has been discussed.

DISCLOSURE

Technical Problem

The object of the present disclosure is to provide a method for a terminal to obtain a data signal in a wireless communication system and apparatus for supporting the same.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

The present disclosure provides a method of obtaining a data signal by a terminal (or user equipment) in a wireless communication system and apparatus for supporting the same.

In one aspect of the present disclosure, a method of obtaining a data signal by a user equipment (UE) in a wireless communication system is provided. The method may include: receiving configuration information about a plurality of control resource sets (CORESETs) configured for the UE; and obtaining the data signal from a first physical downlink shared channel (PDSCH) scheduled by first downlink control information (DCI) received in a first CORESET among the plurality of CORESETs. When an offset between a first reception time of the first DCI and a second reception time of the first PDSCH is smaller than a prescribed threshold, the UE may obtain the data signal from the first PDSCH by assuming a transmission configuration indicator (TCI) state used for physical downlink control channel (PDCCH) quasi co-location (QCL) indication related to one CORESET among one or more CORESETs related to the first CORESET in the latest slot before the first PDSCH.

In the present disclosure, the UE may a capability of receiving signals simultaneously based on N TCI states, where N may be a natural number greater than 2.

The method may further include reporting information about the capability to a base station.

The plurality of CORESETs may include one or more CORESETs related to the first CORESET and one or more CORESETs unrelated to the first CORESET.

The one or more CORESETs related to the first CORESET may be included in the same CORESET group as the first CORESET, and the one or more CORESETs unrelated to the first CORESET may be included in one or more second CORESET groups, which are different from a first CORESET group including the first CORESET.

In this configuration, if the UE has the capability of receiving signals simultaneously based on the N TCI states, the number of CORESET groups included in the plurality of CORESETs may be smaller than or equal to N, where N may be a natural number greater than 2.

The one or more CORESETs related to the first CORESET may be related to the same identifier as the first CORESET, and the one or more CORESETs unrelated to the first CORESET may be related to a different identifier from the first CORESET.

When a second CORESET unrelated to the first CORESET is configured after the first CORESET and before the first PDSCH in the time domain and the one CORESET among the one or more CORESETs related to the first CORESET in the latest slot before the first PDSCH is the first CORESET, the UE may obtain the data signal from the first PDSCH by assuming a TCI state used for PDCCH QCL indication related to the first CORESET rather than the second CORESET.

When an offset between a third reception time of second DCI received in the second CORESET and a fourth reception time of a second PDSCH scheduled by the second DCI is smaller than the prescribed threshold, the UE may obtain the data signal from the second PDSCH by assuming a TCI state used for PDCCH QCL indication related to one CORESET among one or more CORESETs related to the second CORESET in the latest slot before the second PDSCH.

When a third CORESET related to the first CORESET is configured after the first CORESET and before the first PDSCH in the time domain and the one CORESET among the one or more CORESETs related to the first CORESET in the latest slot before the first PDSCH is the third CORESET, the UE may obtain the data signal from the first PDSCH by assuming a TCI state used for PDCCH QCL indication related to the third CORESET rather than the first CORESET.

The prescribed threshold may be determined based on configuration information received through higher layer signaling.

The configuration information about the plurality of CORESETs may be received through higher layer signaling.

The one CORESET among the one or more CORESETs related to the first CORESET in the latest slot before the first PDSCH may be a CORESET with lowest identification information among the one or more CORESETs related to the first CORESET in the latest slot before the first PDSCH.

In another aspect of the present disclosure, a method of obtaining a data signal by a UE is provided. The method may include:

receiving configuration information about a plurality of CORESETs configured for the UE;

when the UE is capable of receiving signals simultaneously based on a plurality of TCI states, buffering a received first signal by assuming a TCI state used for PDCCH QCL indication related to any one CORESET included in a first CORESET group during a first time period related to decoding of first DCI received in a first CORESET included in the first CORESET group, and buffering a received second signal by assuming a TCI state used for PDCCH QCL indication related to any one CORESET included in a second CORESET group during a second time period related to decoding of second DCI received in a second CORESET included in the second CORESET group; and obtaining the data signal from at least one of the first signal or the second signal based on at least one of a first PDSCH scheduled by the first DCI during the first time period or a second PDSCH scheduled by the second DCI during the second time period.

When one or more third CORESETs included in the first CORESET group are configured after the first CORESET within the first time period, the following determination may be made depending on whether the any one CORESET included in the first CORESET group is before or after the one or more third CORESETs.

When the any one CORESET included in the first CORESET group is before the one or more third CORESETs, the any one CORESET may be determined as the first CORESET.

When the any one CORESET included in the first CORESET group is after the one or more third CORESETs, the any one CORESET may be determined as the latest CORESET among the one or more third CORESETs.

In a further aspect of the present disclosure, a UE for obtaining a data signal in a wireless communication system is provided. The UE may include: at least one radio frequency (RF) module; at least one processor; and at least one memory operably connected to the at least one processor and storing instructions that, when executed, cause the at least one processor to perform the following operations. The operations may include: receiving configuration information about a plurality of CORESETs configured for the UE by controlling the at least one RF module; and obtaining the data signal from a PDSCH scheduled by DCI received in a first CORESET among the plurality of CORESETs. When an offset between a first reception time of the DCI and a second reception time of the PDSCH is smaller than a prescribed threshold, the at least one processor may be configured to obtain the data signal from the PDSCH by assuming a TCI state used for PDCCH QCL indication related to one CORESET among one or more CORESETs related to the first CORESET in the latest slot before the PDSCH.

It is to be understood that both the foregoing general description and the following detailed description of the present disclosure are exemplary and explanatory and are intended to provide further explanation of the disclosure as claimed.

Advantageous Effects

As is apparent from the above description, the embodiments of the present disclosure have the following effects.

According to the present disclosure, if a user equipment (UE) is capable of receiving signals simultaneously based on a plurality of transmission configuration indicator (TCI) states, the UE may accurately detect a PDSCH signal scheduled by DCI in each CORESET.

In particular, when the PDSCH signal is scheduled within the decoding time of the DCI, the UE may receive/buffer the PDSCH signal by assuming a suitable TCI state. After decoding the DCI, the UE may obtain a data signal from the PDSCH signal based on decoding results.

It will be appreciated by persons skilled in the art that the effects that could be achieved with the present disclosure are not limited to what has been particularly described hereinabove and other advantages of the present disclosure will be more clearly understood from the following detailed description. That is, effects which are not intended by the present disclosure may be derived by those skilled in the art from the embodiments of the present disclosure.

DESCRIPTION OF DRAWINGS

The accompanying drawings, which are included to provide a further understanding of the present disclosure, illustrate the embodiments of the present disclosure together with detail explanation. However, the technical features of the present disclosure are not limited to a specific drawing. The features disclosed in each of the drawings are combined with each other to configure a new embodiment. Reference numerals in each drawing correspond to structural elements.

BEST MODE

Figure 1:
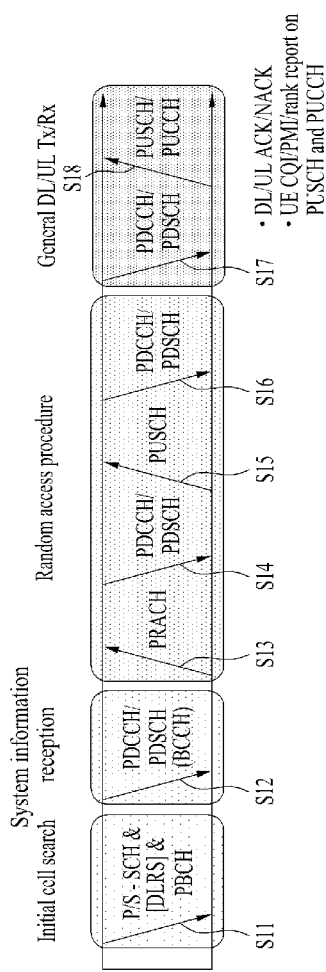
FIG. 1 is a diagram illustrating physical channels and a signal transmission method using the physical channels.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in the embodiments of the present disclosure may be rearranged. Some constructions or elements of any one embodiment may be included in another embodiment and may be replaced with corresponding constructions or features of another embodiment.

In the description of the attached drawings, a detailed description of known procedures or steps of the present disclosure will be avoided lest it should obscure the subject matter of the present disclosure. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present disclosure (more particularly, in the context of the following claims) unless indicated otherwise in the specification or unless context clearly indicates otherwise.

In the embodiments of the present disclosure, a description is mainly made of a data transmission and reception relationship between a base station (BS) and a user equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), gNode B (gNB), an advanced base station (ABS), an access point, etc.

In the embodiments of the present disclosure, the term terminal may be replaced with a UE, a mobile station (MS), a subscriber station (SS), a mobile subscriber station (MSS), a mobile terminal, an advanced mobile station (AMS), etc.

A transmission end is a fixed and/or mobile node that provides a data service or a voice service and a reception end is a fixed and/or mobile node that receives a data service or a voice service. Therefore, a UE may serve as a transmission end and a BS may serve as a reception end, on an uplink (UL). Likewise, the UE may serve as a reception end and the BS may serve as a transmission end, on a downlink (DL).

The embodiments of the present disclosure may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, a 3GPP fifth-generation (5G) new radio access technology (new RAT or NR) system, and a 3GPP2 system. In particular, the embodiments of the present disclosure may be supported by the standard specifications, 3GPP TS 38.211, 3GPP TS 38.212, 3GPP TS 38.213, 3GPP TS 38.321, and 3GPP TS 38.331. That is, the steps or parts, which are not described to clearly reveal the technical idea of the present disclosure, in the embodiments of the present disclosure may be explained by the above standard specifications. All terms used in the embodiments of the present disclosure may be explained by the standard specifications.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that may be implemented according to the disclosure.

The following detailed description includes specific terms in order to provide a thorough understanding of the present disclosure. However, it will be apparent to those skilled in the art that the specific terms may be replaced with other terms without departing the technical spirit and scope of the present disclosure.

Hereinafter, the 3GPP NR system will be described as an example of the wireless access system to which the embodiments of the present disclosure is applied.

The embodiments of the present disclosure may be applied to various wireless access systems such as code division multiple access (CDMA), frequency division multiple access (FDMA), time division multiple access (TDMA), orthogonal frequency division multiple access (OFDMA), single carrier frequency division multiple access (SC-FDMA), etc.

While the embodiments of the present disclosure are described based on the 3GPP NR system in order to clarify the technical features of the present disclosure, the present disclosure is also applicable to other radio systems (e.g., 3GPP LTE, IEEE 802.16, IEEE 802.11, etc.).

1. NR System 1.1. Physical Channels and Signal Transmission and Reception Method Using the Same In a wireless access system, a UE receives information from a BS in DL and transmits information to the BS in UL. The information transmitted and received between the UE and BS includes general data information and various types of control information. There are many physical channels depending on the types/usages of information transmitted and received between the UE and BS.

FIG. 1 illustrates physical channels and a general signal transmission method using the physical channels, which are applicable to the embodiments of the present disclosure.

When a UE is powered on or enters a new cell, the UE performs an initial cell search (S11). The initial cell search involves acquisition of synchronization to a BS. Specifically, the UE synchronizes its timing with the BS and obtains information such as a cell Identifier (ID) by receiving a primary synchronization channel (P-SCH) and a secondary synchronization channel (S-SCH) from the BS.

Then, the UE may obtain information broadcast in the cell by receiving a physical broadcast channel (PBCH) from the BS.

During the initial cell search, the UE may monitor the state of a DL channel by receiving a DL reference signal (RS).

After completing the initial cell search, the UE may obtain more detailed system information by receiving a physical downlink control channel (PDCCH) and a physical downlink shared channel (PDSCH), which depends on information in the PDCCH (S12).

To complete access to the BS, the UE may perform a random access procedure (S13 to S16). To this end, the UE may transmit a preamble over a physical random access channel (PRACH) (S13) and receive a random access response (RAR) for the preamble over the PDCCH and the PDSCH associated therewith (S14). The UE may transmit a physical uplink shared channel (PUSCH) based on scheduling information in the RAR (S15). The UE may perform a contention resolution procedure by receiving a PDCCH signal and a PDSCH signal associated therewith.

After completing the above procedure, the UE may perform reception of a PDCCH signal and/or a PDSCH signal (S17) and transmission of a physical uplink control channel (PUCCH) signal and a PUSCH signal (S18) as a general UL/DL signal transmission procedure.

Control information transmitted from the UE to the BS is generically called uplink control information (UCI). The UCI includes a hybrid automatic repeat and request acknowledgement/negative acknowledgement (HARQ-ACK/NACK), a scheduling request (SR), a channel quality indicator (CQI), a precoding matrix indicator (PMI), a rank indicator (RI), etc.

In general, the UCI may be periodically transmitted over the PUCCH in the NR system. However, in some embodiments, the UCI may be transmitted on the PUSCH (if control information and traffic data need to be transmitted at the same time). In addition, when a UE receives a request/ command from a network, the UE may aperiodically transmit the UCI over the PUSCH.

1.2. Radio Frame Structure

Figure 2:
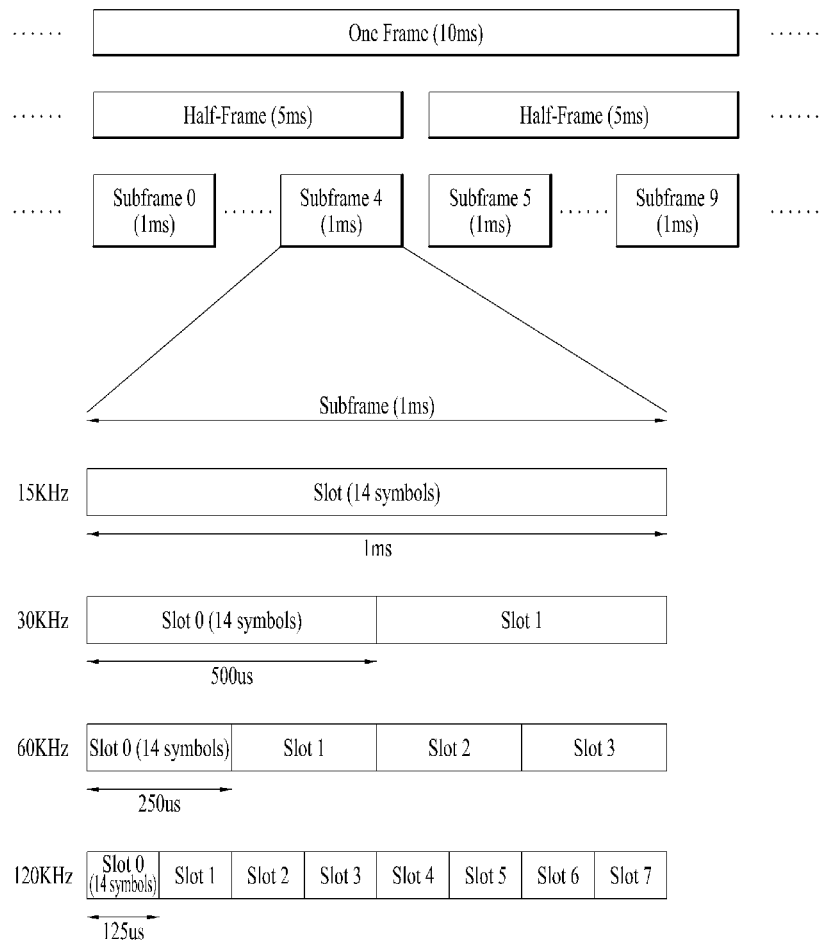
FIG. 2 is a diagram illustrating a radio frame structure in a new radio access technology (NR) system to which the embodiments of the present disclosure are applicable.

FIG. 2 is a diagram illustrating a radio frame structure in the NR system to which the embodiments of the present disclosure are applicable.

Figure 7:
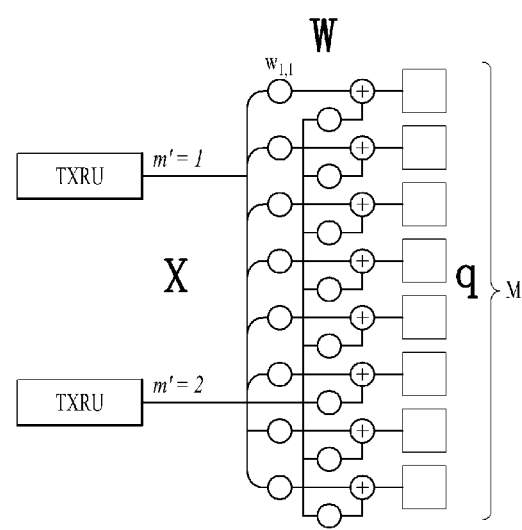

In the NR system, UL and DL transmissions are based on a frame as illustrated in FIG. 7. One radio frame is 10 ms in duration, defined as two 5 -ms half-frames. One half-frame is defined as five 1 -ms subframes. One subframe is divided into one or more slots, and the number of slots in a subframe depends on an SCS. Each slot includes 12 or 14 OFDM(A) symbols according to a CP. Each slot includes 14 symbols in a normal CP case, and 12 symbols in an extended CP case. Herein, a symbol may include an OFDM symbol (or a CP-OFDM symbol) and an SC-FDMA symbol (or a DFT-s-OFDM symbol).

Table 1 lists the number of symbols per slot, the number of slots per frame, and the number of slots per subframe in the normal CP case, and Table 2 lists the number of symbols per slot, the number of slots per frame, and the number of slots per subframe in the extended CP case.

TABLE 1

| $\mu$ | $N_{symb}^{slot}$ | $N_{slot}^{frame, \mu}$ | $N_{slot}^{subframe, \mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

TABLE 2

| $\mu$ | $N_{symb}^{slot}$ | $N_{slot}^{frame, \mu}$ | $N_{slot}^{subframe, \mu}$ |
|---|---|---|---|
| 2 | 12 | 40 | 4 |

In the above tables, $Ns^{slot}_{symb}$ denotes the number of symbols in a slot, $N^{frame,\mu}_{slot}$ denotes the number of slots in a frame, and $N^{subframe,\mu}_{slot}$ denotes the number of slots in a subframe. In the NR system to which the present disclosure is applicable, different OFDM(A) numerologies (e.g., SCSs, CP length, and so on) may be configured for a plurality of cells aggregated for a UE. Therefore, the (absolute) duration of a time resource (e.g., an SF, slot, or TTI) (for the convenience of description, generically referred to as a time unit (TU)) including the same number of symbols may be different between the aggregated cells.

Figure 3:
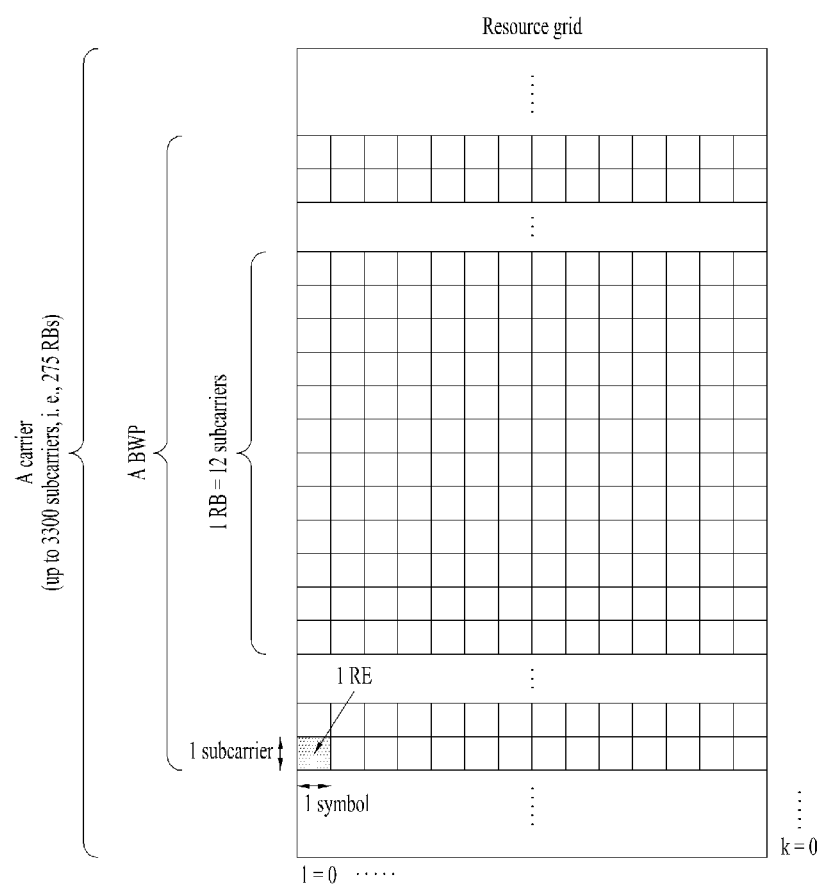
FIG. 3 is a diagram illustrating a slot structure in the NR system to which the embodiments of the present disclosure are applicable.

FIG. 3 is a diagram illustrating a slot structure in the NR system to which the embodiments of the present disclosure are applicable.

One slot includes a plurality of symbols in the time domain. For example, one slot includes 7 symbols in a normal CP case and 6 symbols in an extended CP case.

A carrier includes a plurality of subcarriers in the frequency domain. An RB is defined as a plurality of (e.g., 12) consecutive subcarriers in the frequency domain.

A bandwidth part (BWP) is defined as a plurality of consecutive (P)RBs in the frequency domain and may correspond to one numerology (e.g., SCS, CP length, and so on).

A carrier may include up to N (e.g., 5) BWPs. Data communication may be conducted in an active BWP, and only one BWP may be activated for one UE. In a resource grid, each element is referred to as an RE, to which one complex symbol may be mapped.

Figure 4:
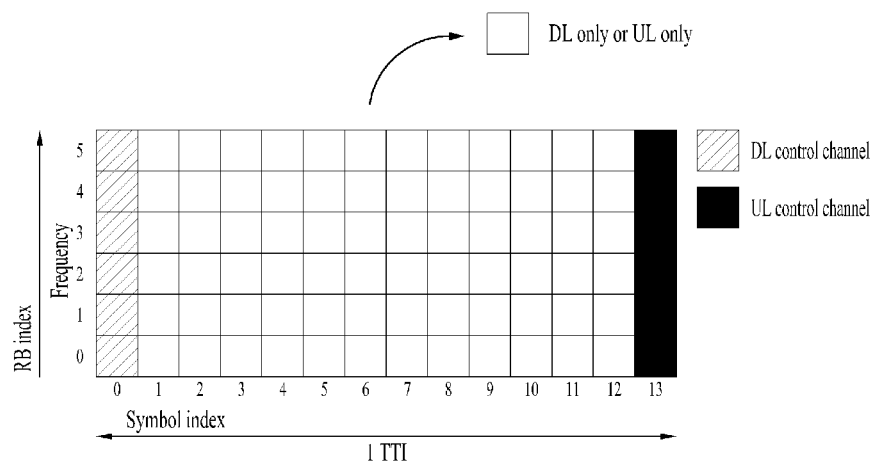
FIG. 4 is a diagram illustrating a self-contained slot structure in the NR system to which the embodiments of the present disclosure are applicable.

FIG. 4 is a diagram illustrating a self-contained slot structures in the NR system to which the embodiments of the present disclosure are applicable.

In FIG. 4, the hatched area (e.g., symbol index=0) indicates a DL control region, and the black area (e.g., symbol index=13) indicates a UL control region. The remaining area (e.g., symbol index=1 to 12) may be used for DL or UL data transmission.

Based on this structure, an eNB and a UE may sequentially perform DL transmission and UL transmission in one slot. That is, the eNB and UE may transmit and receive not only DL data but also a UL ACK/NACK for the DL data in one slot. Consequently, this structure may reduce a time required until data retransmission when a data transmission error occurs, thereby minimizing the latency of a final data transmission.

In this self-contained slot structure, a predetermined length of time gap is required to allow the eNB and UE to switch from transmission mode to reception mode and vice versa. To this end, in the self-contained slot structure, some OFDM symbols at the time of switching from DL to UL may be configured as a guard period (GP).

Although it has been described above that the self-contained slot structure includes both DL and UL control regions, these control regions may be selectively included in the self-contained slot structure. In other words, the self-contained slot structure according to the present disclosure may include either the DL control region or the UL control region as well as both the DL and UL control regions as illustrated in FIG. 4.

Further, the order of regions in one slot may vary in some embodiments. For example, one slot may be configured in the following order: DL control region, DL data region, UL control region, and UL data region, or UL control region, UL data region, DL control region, and DL data region.

A PDCCH may be transmitted in the DL control region, and a PDSCH may be transmitted in the DL data region. A PUCCH may be transmitted in the UL control region, and a PUSCH may be transmitted in the UL data region.

The PDCCH may deliver downlink control information (DCI), for example, DL data scheduling information, UL data scheduling information, and so on. The PUCCH may deliver uplink control information (UCI), for example, an ACK/NACK for DL data, channel state information (CSI), a scheduling request (SR), and so on.

The PDSCH carries DL data (e.g., DL-shared channel transport block (DL-SCH TB)) and uses a modulation scheme such as quadrature phase shift keying (QPSK), 16-ary quadrature amplitude modulation (16QAM), 64QAM, or 256QAM. A TB is encoded into a codeword. The PDSCH may deliver up to two codewords. Scrambling and modulation mapping are performed on a codeword basis, and modulation symbols generated from each codeword are mapped to one or more layers (layer mapping). Each layer is mapped to resources together with a demodulation reference signal (DMRS or DM-RS), created as an OFDM symbol signal, and then transmitted through a corresponding antenna port.

The PDCCH carries DCI and uses QPSK as a modulation scheme. One PDCCH includes 1, 2, 4, 8, or 16 control channel elements (CCEs) according to an aggregation level (AL). One CCE includes 6 resource element groups (REGs). One REG is defined as one OFDM symbol by one (P)RB.

Figure 5:
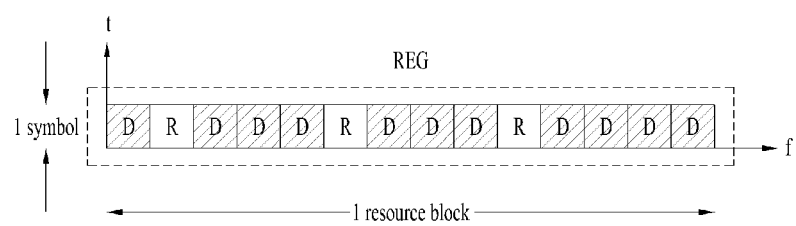
FIG. 5 is a diagram illustrating a resource element group (REG) structure in the NR system to which the embodiments of the present disclosure are applicable.

FIG. 5 is a diagram illustrating the structure of one REG in the NR system to which the embodiments of the present disclosure are applicable.

In FIG. 5, D denotes an RE to which DCI is mapped, and R denotes an RE to which a DMRS is mapped. The DMRS is mapped to REs #1, #5, and #9 along the frequency axis in one symbol.

The PDCCH is transmitted in a control resource set (CORESET). A CORESET is defined as a set of REGs having a given numerology (e.g., SCS, CP length, and so on). A plurality of CORESETs for one UE may overlap with each other in the time/frequency domain. A CORESET may be configured by system information (e.g., a master information block (MIB)) or by UE-specific higher layer (RRC) signaling. Specifically, the number of RBs and the number of symbols (up to 3 symbols) included in a CORESET may be configured by higher-layer signaling.

The PUSCH carries UL data (e.g., UL-shared channel transport block (UL-SCH TB)) and/or UCI and is transmitted based on a CP-OFDM waveform or a DFT-s-OFDM waveform. When the PUSCH is transmitted in the DFT-s-OFDM waveform, the UE transmits the PUSCH by applying transform precoding. For example, when transform precoding is impossible (e.g., disabled), the UE may transmit the PUSCH in the CP-OFDM waveform, while when transform precoding is possible (e.g., enabled), the UE may transmit the PUSCH in the CP-OFDM or DFT-s-OFDM waveform. PUSCH transmission may be dynamically scheduled by a UL grant in DCI, or semi-statically scheduled by higher-layer (e.g., RRC) signaling (and/or layer 1 (L1) signaling such as a PDCCH) (configured grant). Both codebook based PUSCH transmission and non-codebook based PUSCH transmission may be allowed.

The PUCCH carries UCI, an HARQ-ACK, and/or an SR. Depending on the transmission duration of the PUCCH, the PUCCH is classified into a short PUCCH and a long PUCCH. Table 3 lists exemplary PUCCH formats.

TABLE 3

| PUCCH format | Length in OFDM symbols $N_{symb}^{PUCCH}$ | Number of bits | Usage | Etc |
| --- | --- | --- | --- | --- |
| 0 | 1-2 | ≤2 | HARQ, SR | Sequence selection |
| 1 | 4-14 | ≤2 | HARQ, [SR] | Sequence modulation |
| 2 | 1-2 | >2 | HARQ, CSI, [SR] | CP-OFDM |
| 3 | 4-14 | >2 | HARQ, CSI, [SR] | DFT-s-OFDM (no UE multiplexing) |
| 4 | 4-14 | >2 | HARQ, CSI, [SR] | DFT-s-OFDM (Pre DFT OCC) |

PUCCH format 0 carries UCI of up to 2 bits and is mapped in a sequence-based manner, for transmission. Specifically, the UE transmits specific UCI to the eNB by transmitting one of a plurality of sequences on a PUCCH of PUCCH format 0. Only when the UE transmits a positive SR, the UE transmits the PUCCH of PUCCH format 0 in a PUCCH resource for a corresponding SR configuration.

PUCCH format 1 carries UCI of up to 2 bits and modulation symbols are spread with an orthogonal cover code (OCC) (which is configured differently depending on whether frequency hopping is performed) in the time domain. The DMRS is transmitted in a symbol in which a modulation symbol is not transmitted (i.e., transmitted by time division multiplexing (TDM)).

PUCCH format 2 carries UCI of more than 2 bits and modulation symbols are transmitted by frequency division multiplexing (FDM) with the DMRS. The DMRS is located in symbols #1, #4, #7, and #10 of a given RB with a density of ⅓. A pseudo noise (PN) sequence is used for a DMRS sequence. For 2-symbol PUCCH format 2, frequency hopping may be activated.

PUCCH format 3 does not support UE multiplexing in the same PRBs and carries UCI of more than 2 bits. In other words, PUCCH resources of PUCCH format 3 include no OCC. Modulation symbols are transmitted by TDM with the DMRS.

PUCCH format 4 supports multiplexing of up to 4 UEs in the same PRBs and carries UCI of more than 2 bits. In other words, PUCCH resources of PUCCH format 3 includes an OCC. Modulation symbols are transmitted in TDM with the DMRS.

1.3. Analog Beamforming

In a millimeter wave (mmW) system, since a wavelength is shortened, a plurality of antenna elements may be installed in the same area. That is, considering that the wavelength at 30 GHz band is 1 cm, a total of 100 antenna elements may be installed in a 5 * 5 cm panel at intervals of 0.5 lambda (wavelength) in the case of a 2-dimensional array. Therefore, in the mmW system, it is possible to improve the coverage or throughput by increasing the beamforming (BF) gain using multiple antenna elements.

In this case, each antenna element may include a transceiver unit (TXRU) to enable adjustment of transmit power and phase per antenna element. By doing so, each antenna element may perform independent beamforming per frequency resource.

However, installing TXRUs in all of the about 100 antenna elements is less feasible in terms of cost. Therefore, a method of mapping a plurality of antenna elements to one TXRU and adjusting the direction of a beam using an analog phase shifter has been considered. However, this method is disadvantageous in that frequency selective beamforming is impossible because only one beam direction is generated over the full band.

To solve this problem, as an intermediate form of digital BF and analog BF, hybrid BF with B TXRUs that are fewer than Q antenna elements may be considered. In the case of the hybrid BF, the number of beam directions that may be transmitted at the same time is limited to B or less, which depends on how B TXRUs and Q antenna elements are connected.

Figure 6:
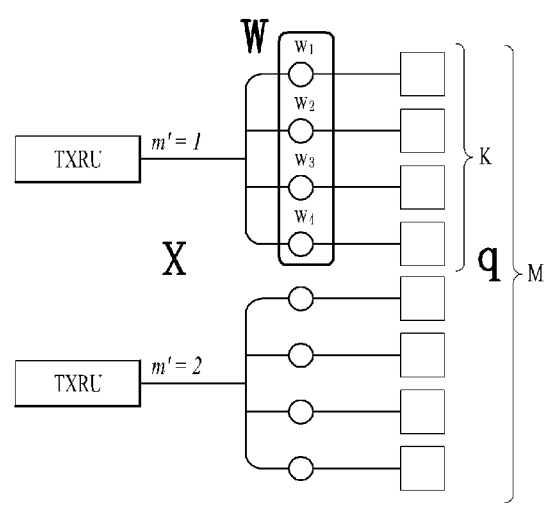
FIGS. 6 and 7 are diagrams illustrating representative methods of connecting transceiver units (TXRUs) to antenna elements.

FIGS. 6 and 7 are diagrams illustrating representative methods for connecting TXRUs to antenna elements. Here, the TXRU virtualization model represents the relationship between TXRU output signals and antenna element output signals.

Figure 11:
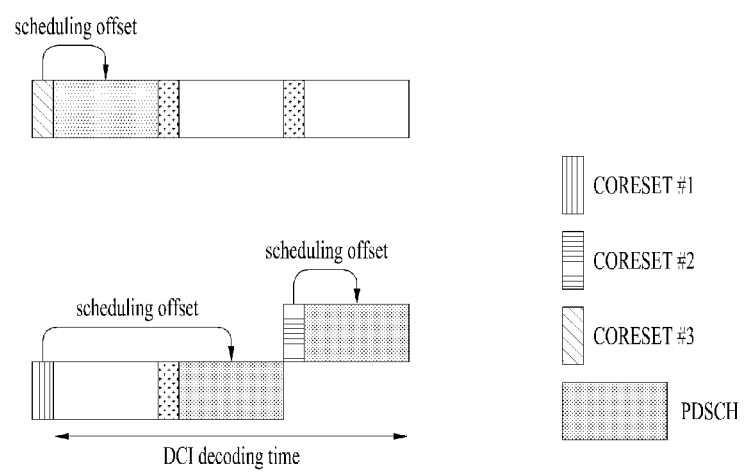
FIGS. 11 to 16 are diagrams illustrating examples for explaining user equipment (UE) operations related to a plurality of control resource sets (CORESETs) and physical downlink shared channels (PDSCHs_related to the plurality of CORESETs according to the present disclosure.

FIG. 6 shows a method for connecting TXRUs to sub-arrays. In FIG. 11, one antenna element is connected to one TXRU.

Meanwhile, FIG. 7 shows a method for connecting all TXRUs to all antenna elements. In FIG. 7, all antenna elements are connected to all TXRUs. In this case, separate addition units are required to connect all antenna elements to all TXRUs as shown in FIG. 7.

In FIGS. 6 and 7, W indicates a phase vector weighted by an analog phase shifter. That is, W is a major parameter determining the direction of the analog beamforming. In this case, the mapping relationship between channel state information reference signal (CSI-RS) antenna ports and TXRUs may be 1:1 or 1-to-many.

The configuration shown in FIG. 6 has a disadvantage in that it is difficult to achieve beamforming focusing but has an advantage in that all antennas may be configured at low cost.

On the contrary, the configuration shown in FIG. 7 is advantageous in that beamforming focusing may be easily achieved. However, since all antenna elements are connected to the TXRU, it has a disadvantage of high cost.

When a plurality of antennas is used in the NR system to which the present disclosure is applicable, a hybrid beamforming (BF) scheme in which digital BF and analog BF are combined may be applied. In this case, analog BF (or radio frequency (RF) BF) means an operation of performing precoding (or combining) at an RF stage. In hybrid BF, each of a baseband stage and the RF stage perform precoding (or combining) and, therefore, performance approximating to digital BF may be achieved while reducing the number of RF chains and the number of a digital-to-analog (D/A) (or analog-to-digital (A/D) converters.

For convenience of description, a hybrid BF structure may be represented by N transceiver units (TXRUs) and M physical antennas. In this case, digital BF for L data layers to be transmitted by a transmission end may be represented by an N-by-L matrix. N converted digital signals obtained thereafter are converted into analog signals via the TXRUs and then subjected to analog BF, which is represented by an M-by-N matrix.

Figure 8:
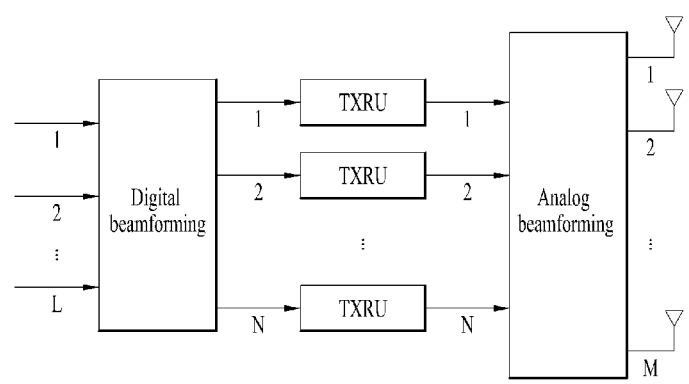
FIG. 8 is a schematic diagram illustrating a hybrid beamforming structure from the perspective of TXRUs and physical antennas according to an example of the present disclosure.

FIG. 8 is a diagram schematically illustrating an exemplary hybrid BF structure from the perspective of TXRUs and physical antennas according to the present disclosure. In FIG. 8, the number of digital beams is L and the number analog beams is N.

Additionally, in the NR system to which the present disclosure is applicable, an BS designs analog BF to be changed in units of symbols to provide more efficient BF support to a UE located in a specific area. Furthermore, as illustrated in FIG. 8, when N specific TXRUs and M RF antennas are defined as one antenna panel, the NR system according to the present disclosure considers introducing a plurality of antenna panels to which independent hybrid BF is applicable.

In the case in which the BS utilizes a plurality of analog beams as described above, the analog beams advantageous for signal reception may differ according to a UE. Therefore, in the NR system to which the present disclosure is applicable, a beam sweeping operation is being considered in which the BS transmits signals (at least synchronization signals, system information, paging, and the like) by applying different analog beams in a specific subframe (SF) or slot on a symbol-by-symbol basis so that all UEs may have reception opportunities.

Figure 9:
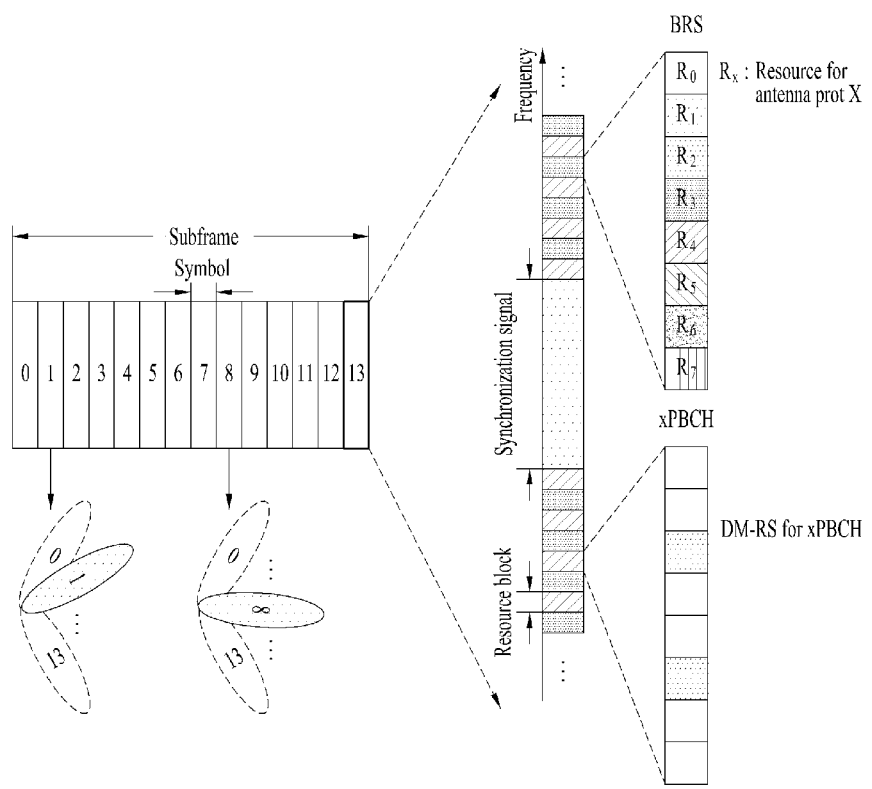
FIG. 9 is a schematic diagram illustrating a beam sweeping operation for a synchronization signal and system information in a downlink transmission procedure according to an example of the present disclosure.

FIG. 9 is a diagram schematically illustrating an exemplary beam sweeping operation for a synchronization signal and system information in a DL transmission procedure according to the present disclosure.

In FIG. 9 below, a physical resource (or physical channel) on which the system information of the NR system to which the present disclosure is applicable is transmitted in a broadcasting manner is referred to as an xPBCH. Here, analog beams belonging to different antenna panels within one symbol may be simultaneously transmitted.

As illustrated in FIG. 9, in order to measure a channel for each analog beam in the NR system to which the present disclosure is applicable, introducing a beam RS (BRS), which is a reference signal (RS) transmitted by applying a single analog beam (corresponding to a specific antenna panel), is being discussed. The BRS may be defined for a plurality of antenna ports and each antenna port of the BRS may correspond to a single analog beam. In this case, unlike the BRS, a synchronization signal or the xPBCH may be transmitted by applying all analog beams in an analog beam group such that any UE may receive the signal well.

1.4. Demodulation Reference Signal (DMRS)

In the NR system to which the present disclosure is applicable, a DMRS may be transmitted and received based on a front-load structure. Alternatively, an additional DMRS may be transmitted and received in addition to the front-loaded DMRS.

The front-loaded DMRS may support fast decoding. The first OFDM symbol in which the front-loaded DMRS is loaded may be determined as the third (e.g., 1=2) or fourth (e.g., 1=3) OFDM symbol. The location of the first OFDM symbol may be indicated by a PBCH.

The number of OFDM symbols occupied by the front-loaded DMRS may be indicated by a combination of DCI and radio resource control (RRC) signaling.

The additional DMRS may be configured for a high-speed UE. The additional DMRS may be located at intermediate/last symbol(s) in a slot. When one front-loaded DMRS is configured, the additional DMRS may be allocated to zero to three OFDM symbols. When two front-loaded DMRSs are configured, the additional DMRS may be allocated to zero or two OFDM symbols.

The front-loaded DMRS may be configured to have two types. One of the two types may be indicated by higher layer signaling (e.g., RRC signaling).

FIG. 8 is a diagram schematically illustrating two DMRS configuration types applicable to the present disclosure.

In FIG. 8, P0 to P11 may correspond to port numbers 1000 to 1011, respectively. Among of the two DMRS configuration types, a DMRS configuration type that is actually configured for a UE, may be indicated by higher layer signaling (e.g., RRC signaling).

In the case of DMRS configuration type 1, it may be subdivided as follows depending on the number of OFDM symbols allocated for the front-loaded DMRS.

DMRS configuration type 1 and the number of OFDM symbols allocated for the front-loaded DMRS=1

A maximum of four ports (e.g., P0 to P3) may be multiplexed based on length-2 frequency-code division multiplexing (F-CDM) and frequency division multiplexing (FDM). The RS density may be set to four REs per port in an RB.

DMRS configuration type 1 and the number of OFDM symbols allocated for the front-loaded DMRS=2

A maximum of 8 ports (e.g., P0 to P7) may be multiplexed based on length-2 F-CDM, length-2 time-code division multiplexing (T-CDM), and FDM. The RS density may be set to 6 REs per port in an RB. When the presence of a PT-RS is configured by higher layer signaling, the T-CDM may be fixed to [1 1]. The RS density may be set to 12 REs per port in an RB.

In the case of DMRS configuration type 2, it may be subdivided as follows depending on the number of OFDM symbols allocated for the front-loaded DMRS.

DMRS configuration type 2 and the number of OFDM symbols allocated for the front-loaded DMRS=1

A maximum of 6 ports (e.g., P0 to P5) may be multiplexed based on length-2 F-CDM and FDM. The RS density may be set to four REs per port in an RB.

DMRS configuration type 2 and the number of OFDM symbols allocated for the front-loaded DMRS=2

A maximum of 12 ports (e.g., P0 to P11) may be multiplexed based on length-2 F-CDM, length-2 T-CDM, and FDM. The RS density may be set to 6 REs per port in an RB. When the presence of a PT-RS is configured by higher layer signaling, the T-CDM may be fixed to [1 1]. The RS density may be set to 8 REs per port in an RB.

Figure 10:
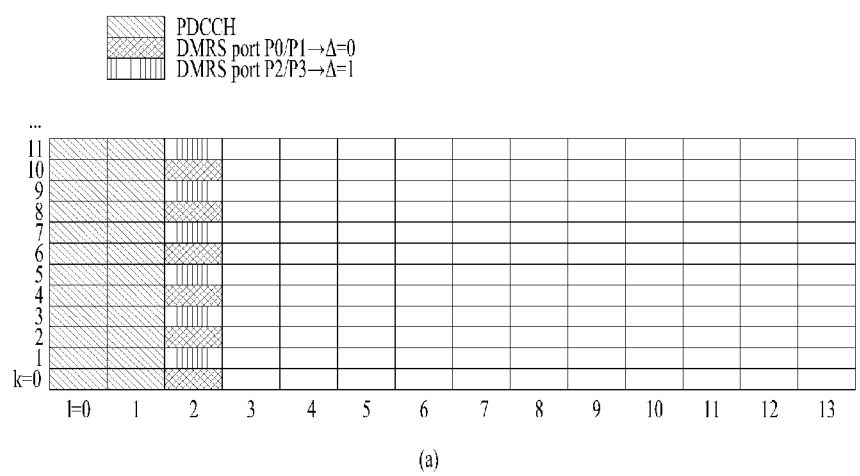
FIG. 10 is a diagram schematically illustrating an example of a front-loaded demodulation reference signal (DMRS) with DMRS configuration type 1 applicable to the present disclosure.
Figure 10:
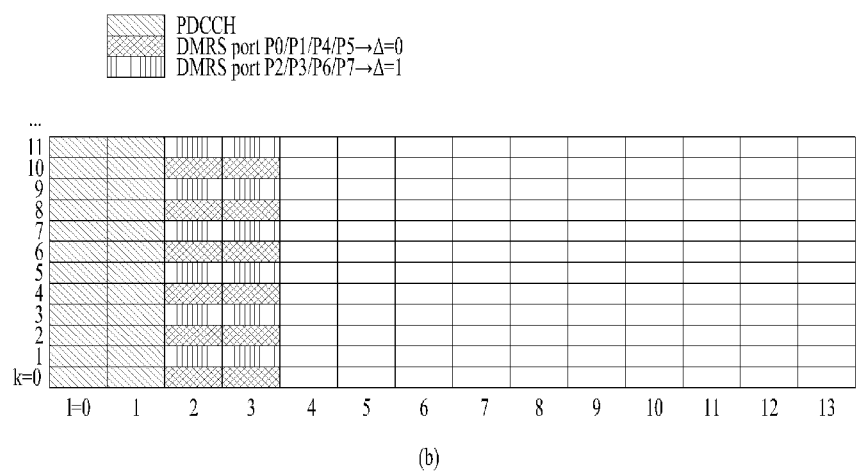

FIG. 10 is a diagram schematically illustrating an example of a front-loaded DMRS with DMRS configuration type 1 applicable to the present disclosure.

Specifically, FIG. 10 (*a*) shows a structure where the DMRS is front-loaded in one symbol (front-loaded DMRS with one symbol), and FIG. 9 (*b*) shows a structure where the DMRS is front-loaded in two symbols (front loaded DMRS with two symbols).

In FIG. 9, A denotes a DMRS offset value in the frequency domain. In this case, DMRS ports with the same value of A may be code division multiplexed in the frequency domain (CDM-F) or code division multiplexed in the time domain (CDM-T). In addition, CDM-F may also be applied to DMRS ports with different values of A.

A UE may obtain DM-RS port configuration information configured by a BS from DCI.

1.5. DMRS Port Group

In the present disclosure, a DMRS port group may refer to a set of DMRS ports that are quasi co-located (QCLed) or partially QCLed. Here, quasi co-location (QCL) may mean that long-term channel parameters such as Doppler spread and/or Doppler shift, average delay, delay spread, etc. are assumed to be the same. Partial QCL may mean that some of the long-term channel parameters are assumed to be the same.

1.6. DCI Format

The NR system to which the present disclosure is applicable may support the following DCI formats. Specifically, the NR system may support DCI format 0_0 and DCI format 0_1 for PUSCH scheduling and support DCI format 1_0 and DCI format 1_1 for PDSCH scheduling. In addition, the NR system may additionally support DCI format 2_0, DCI format 2_1, DCI format 2_2, and DCI format 2_3 for other purposes.

DCI format 0_0 may be used to schedule a transmission port (TB)-based (or TB-level) PUSCH, and DCI format 0_1 may be used to schedule the TB-based (or TB-level) PUSCH or a code block group (CBG)-based (or CBG-level) PUSCH (when CBG-based signal transmission and reception are configured).

DCI format 1_0 may be used to schedule a TB-based (or TB-level) PDSCH, and DCI format 1_1 may be used to schedule the TB-based (or TB-level) PDSCH or a CBG-based (or CBG-level) PDSCH (when the CBG-based signal transmission and reception are configured).

DCI format 2_0 may be used to notify a slot format. DCI format 2_1 may be used to notify PRB(s) and OFDM symbol(s) where a UE assumes that no transmission is intended for the UE. DCI format 2_2 may be used to transmit transmission power control (TPC) commands for the PUCCH and the PUSCH. DCI format 2_3 may be used to transmit a group of TPC commands for SRS transmission at one or more UEs.

The details of the DCI formats may be found in 3GPP TS 28.212. That is, the features of the DCI formats which are not described in the present disclosure may be found in the specification. In addition, the definitions of all terms used herein may also found in the specification.

1.7. Control Resource Set (CORESET)

One CORESET includes $N^{CORESET}_{RB}$ RBs in the frequency domain and $N^{CORESET}_{symb}$ symbols (having a value of 1, 2, or 3) in the time domain.

One CCE includes 6 REGs and one REG is equal to one RB in one OFDM symbol. REGs in the CORESET are numbered in a time-first manner. Specifically, the REGs are numbered starting with '0' for the first OFDM symbol and the lowest-numbered RB in the CORESET.

A plurality of CORESETs may be configured for one UE. Each CORESET is related only to one CCE-to-REG mapping relationship.

CCE-to-REG mapping for one CORESET may be interleaved or non-interleaved.

Configuration information about the CORESET may be configured by a higher layer parameter ControlResourceSet IE.

In addition, configuration information for CORESET 0 (e.g., common CORESET) may be configured by a higher layer parameter ControlResourceSetZero IE.

1.8. Antenna Port Quasi Co-Location

One UE may be configured with a list of up to M transmission configuration indicator (TCI) state configurations. The maximum of M TCI-state configurations may be configured by a higher layer parameter PDSCH-Config (for the UE) to decode a PDSCH according to a detected PDCCH with DCI intended for the UE and a given serving cell. Herein, M may be determined depending on the capability of the UE.

Each TCI state contains a parameter for configuring a QCL relationship between one or two DL RSs and the DMRS ports of the PDSCH. The QCL relationship is configured by a higher layer parameter qcl-Type1 for a first DL RS and a higher layer parameter qcl-Type2 for a second DL RS (if configured). For the two DL RSs, the QCL types shall not be the same, regardless of whether the RSs are the same DL RS or different DL RSs. The QCL type corresponds to each DL RS given by a higher layer parameter qcl-Type in a higher layer parameter QCL Info and may have one of the following values.

'QCL-TypeA': {Doppler shift, Doppler spread, average delay, delay spread}
'QCL-TypeB': {Doppler shift, Doppler spread}
'QCL-TypeC': {Doppler shift, average delay}
'QCL-TypeD': {Spatial Rx parameter}

The UE receives an activation command used to map up to 8 TCI states to code points of a TCI field in DCI. When a HARQ-ACK signal for a PDSCH carrying the activation command is transmitted in slot #n, mapping between the TCI states and the code points of the TCI field in the DCI may be applied starting from slot $\#(n+3 * N^{subframe,\mu}_{slot}+1)$. In this case, $N^{subframe,\mu}_{slot}$ is determined based on Table 1 or 2 described above. After receiving the initial higher layer configurations of the TCI states and before receiving the activation command, the UE assumes that the DMRS port(s) of the PDSCH of the serving cell are QCLed with an SS/PBCH block determined in the initial access procedure with respect to 'QCL-TypeA'. Additionally, the UE may assume that the DMRS port(s) of the PDSCH of the serving cell are QCLed with the SS/PBCH block determined in the initial access procedure with respect to 'QCL-TypeD' at the above timing.

If a higher layer parameter tci-PresentInDCI is set as 'enabled' for a CORESET scheduling the PDSCH, the UE assumes that the TCI field is present in a PDCCH of DCI format 1_1 transmitted on the CORESET. When the higher layer parameter tci-PresentInDCI is not configured for the CORESET scheduling the PDSCH or the PDSCH is scheduled by DCI format 1_0, if a time offset between the reception of the DL DCI and the reception of the corresponding PDSCH is greater than or equal to a threshold Threshold-Sched-Offset (where the threshold is based on UE capability), the UE assumes that the TCI state or QCL assumption for the PDSCH is the same as the TCI state or QCL assumption applied to the CORESET used for the PDCCH transmission in order to determine PDSCH antenna port QCL.

If the higher layer parameter tci-PresentInDCI is set as 'enabled', the TCI field in DCI scheduling a component carrier (CC) points to activated TCI states in the scheduled CC or a DL BW, and a PDSCH is scheduled by DCI format 1_1, the UE uses a TCI state according to the TCI field in the DCI in a detected PDCCH to determine the PDSCH antenna port QCL. If the time offset between the reception of the DL DCI and the reception of the corresponding PDSCH is greater than or equal to the threshold Threshold-Sched-Offset (where the threshold is determined based on reported UE capability), the UE assumes that DMRS port(s) of the PDSCH of the serving cell are QCLed with RS(s) in the TCI state with respect to QCL type parameter(s) given by an indicated TCI state. When the UE is configured with a single-slot PDSCH, the indicated TCI state should be based on activated TCI states in a slot with the scheduled PDSCH. When the UE is configured with a CORESET associated with a search space set for cross-carrier scheduling, the UE expects that the higher layer parameter tci-PresentInDCI is set as 'enabled' for the CORESET. If one or more of the TCI states configured for the serving cell scheduled by the search space set contains 'QCL-TypeD', the UE expects the time offset between the reception of the detected PDCCH in the search space set and the reception of the corresponding PDSCH is greater than or equal to the threshold Threshold-Sched-Offset.

For both the cases where the higher layer parameter tci-PresentInDCI is set as 'enabled' and the higher layer parameter tci-PresentInDCI is not configured in RRC connected mode, if the time offset between the reception of the DL DCI and the corresponding PDSCH is less than the threshold Threshold-Sched-Offset, the UE may use the following assumptions: (i) the DMRS port(s) of the PDSCH of the serving cell are QCLed with the RS(s) in the TCI state with respect to QCL parameter(s); and (ii) the QCL parameter(s) are used for PDCCH QCL indication of the CORESET associated with a search space monitored with the lowest CORESET-ID in the latest slot in which one or more CORESETs within the active BWP of the serving cell are monitored by the UE. (For both the cases when higher layer parameter tci-PresentInDCI is set to 'enabled' and the higher layer parameter tci-PresentInDCI is not configured in RRC connected mode, if the offset between the reception of the DL DCI and the corresponding PDSCH is less than the threshold Threshold-Sched-Offset, the UE may assume that the DM-RS ports of PDSCH of a serving cell are quasi co-located with the RS(s) in the TCI state with respect to the QCL parameter(s) used for PDCCH quasi co-location indication of the CORESET associated with a monitored search space with the lowest CORESET-ID in the latest slot in which one or more CORESETs within the active BWP of the serving cell are monitored by the UE.)

In this case, if 'QCL-TypeD' of a PDSCH DM-RS is different from 'QCL-TypeD' of a PDCCH DM-RS which overlaps with the PDSCH DM-RS in at least one symbol, the UE is expected to prioritize the reception of the PDCCH associated with a corresponding CORESET. This operation may be equally applied to an intra-band CA case (when the PDSCH and the CORESET are on different CCs). If there are no TCI states including 'QCL-TypeD' among configured TCI states, the UE obtains different QCL assumptions from TCI states indicated for a scheduled PDSCH, regardless of the time offset between the reception of the DL DCI and the reception of the corresponding PDSCH.

2. Proposed Embodiments

Hereinafter, the configurations according to the present disclosure will be described in detail based on the above-described technical features.

In the present disclosure, the term 'CORESET' may be replaced with 'search space', 'CORESET and search space', or 'PDCCH'. The reason for this is that when a control channel is configured for a UE, the control channel is configured based on a combination of a CORESET and a search space. The details of the configuration may be found in 3GPP TS 38.211, TS 38.212, TS 38.213, TS 38.214, and TS 38.331.

In the drawings, it is assumed that the search space is configured in a region denoted as 'CORESET'. Thus, the region denoted as 'CORESET' may be interpreted to mean 'PDCCH'.

FIG. 11 is a diagram illustrating a first example for explaining UE operations related to a plurality of CORESETs and PDSCHs related to the plurality of CORESETs according to the present disclosure.

In FIG. 11, it is assumed that CORESET #1 and CORESET #3 are configured at the same time and CORESET #2 is configured at a different time from CORESET #1 and CORESET #3. In addition, when a scheduling offset (i.e., a time duration between a CORESET and a PDSCH scheduled by DCI in the CORESET) is less than the (CORESET) decoding time of a UE, the UE needs to buffer signals received after the CORESET (i.e., the UE needs to buffer the signals received after the CORESET in an extra memory). Then, the UE may determine whether the PDSCH scheduled by the DCI is present in the buffered signals by decoding the DCI in the CORESET. If the PDSCH is present in the buffered signals, the UE may decode the PDSCH.

In FIG. 11, when CORESETs #1 and #3 are configured at the same time, if TCI states or UE Rx beams for receiving the CORESETs are different from each other, the UE needs to receive one of the CORESETs (unless the UE supports different TCI states or different Rx beams).

To this end, the UE may select and receive any one CORESET based on identification information about a plurality of CORESETs configured at the same time. For example, the UE may select and receive a CORESET with the lowest ID value from among the plurality of CORESETs. In FIG. 11, the UE may select and receive CORESET #1 instead of CORESET #3. To this end, the UE may receive CORESET #1 based on the TCI state or Rx beam related to CORESET #1 and buffer signals received based on the TCI state or Rx beam (until the UE completes decoding DCI in CORESET #1).

According to the present disclosure, the UE may buffer signals received based on different TCI states or different Rx beams separately or together. However, this operation may depend on UE implementation.

In the present disclosure, the following expression "the QCL of a PDSCH follows the TCI state of CORESET #X" may be interpreted to mean that the QCL of the PDSCH follows the TCI state used for PDCCH QCL indication of CORESET #X. Alternatively, the corresponding expression may be interpreted to mean that the DMRS of the PDSCH is QCLed with 1) an RS included in the TCI state of CORESET #X 2) in terms of a corresponding QCL parameter. In the present disclosure, a TCI state includes a QCL source and a QCL parameter, where the QCL source corresponds to an RS and the QCL parameter is one of QCL-types A, B, C, and D.

2.1. Method 1

In Method 1 according to the present disclosure, a case in which a UE receives a signal based on only one TCI state or one Rx beam will be described.

Figure 12:
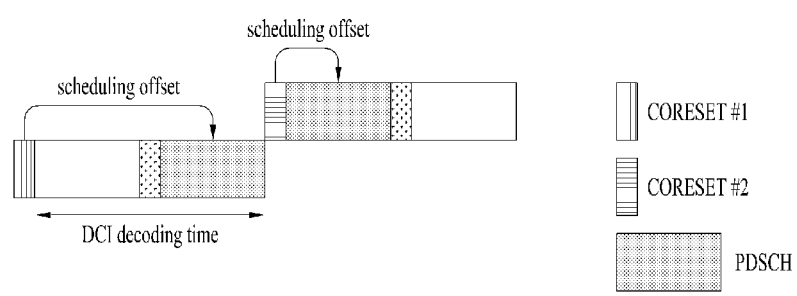

FIG. 12 is a diagram illustrating a second example for explaining UE operations related to a plurality of CORESETs and PDSCHs related to the plurality of CORESETs according to the present disclosure.

Referring to FIG. 12, during the DCI decoding time (or Threshold-Sched-Offset) for CORESET #1, a UE may not receive other CORESETs. In this case, to receive a PDSCH that is scheduled by CORESET #1 and transmitted within the DCI decoding time for CORESET #1, the UE may assume that the QCL of a DMRS port (or DMRS port group) of the PDSCH (which is scheduled by CORESET #1 and transmitted within the DCI decoding time) follows the TCI state of CORESET #1. Similarly, to receive a PDSCH that is scheduled by CORESET #2 and transmitted within the DCI decoding time for CORESET #2, the UE may assume that the QCL of a DMRS port (or DMRS port group) of the PDSCH (which is scheduled by CORESET #2 and transmitted within the DCI decoding time) follows the TCI state of CORESET #2.

Figure 13:
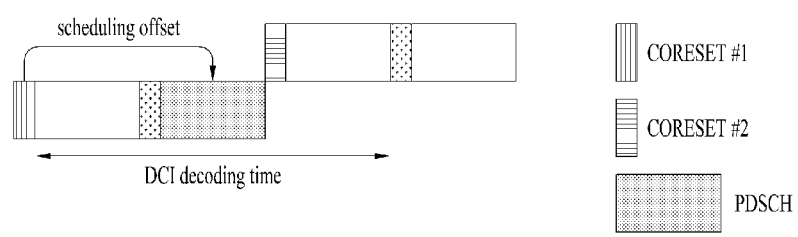

FIG. 13 is a diagram illustrating a third example for explaining UE operations related to a plurality of CORESETs and PDSCHs related to the plurality of CORESETs according to the present disclosure.

Referring to FIG. 13, during the DCI decoding time (or Threshold-Sched-Offset) for CORESET #1, a UE may receive (or may need to receive) other CORESETs.

According to the related art, the UE needs to assume that the QCL of a DMRS port (or DMRS port group) of a PDSCH received within the DCI decoding time of CORESET #1 follows the TCI state of the most recently received CORESET (i.e., CORESET #2). However, referring to FIG. 13, the UE may need to assume that the PDSCH scheduled by CORESET #1 follows the TCI state of CORESET #1 rather than CORESET #2 to receive the PDSCH.

Accordingly, such a problem may occur when the scenario configuration proposed in the present disclosure is applied to the related art. To solve the problem, the present disclosure proposes the following two methods.

2.1.1. Method 1-1

A UE may expect that different CORESETs are not configured within the DCI decoding time (or Threshold-Sched-Offset). In other words, a BS may be restricted/limited such that the BS sets the minimum interval between different CORESETs for the UE to be more than or equal to the DCI decoding time (or Threshold-Sched-Offset) of the UE.

According to this method, since different CORESETs are not received within the DCI decoding time (or Threshold-Sched-Offset) of the UE, the UE may receive/buffer all PDSCHs received during the DCI decoding time (or Threshold-Sched-Offset) based on the TCI states indicated by the CORESET in the latest slot. In addition, the UE may determine whether there is a PDSCH scheduled by DCI (after the DCI decoding time (or Threshold-Sched-Offset)) in the buffered signals by decoding the DCI. If the PDSCH is present in the buffered signals, the UE may decode the PDSCH.

2.1.2. Method 1-2

According to Method 1-1, there may be a restriction that when a specific UE is configured with different CORESETs, the minimum interval therebetween should be greater than or equal to Threshold-Sched-Offset (or the DCI decoding time) (of the specific UE). Such a restriction may impede the efficient use of resources.

According to Method 1-2, when different CORESETs are configured within Threshold-Sched-Offset (or the DCI decoding time) (of the UE), the UE may assume that the QCL of a PDSCH scheduled before the different CORESETs follows the TCI state used for PDCCH QCL indication of a CORESET configured (at the latest time) immediately before the reception of the PDSCH. Accordingly, TS 38.214 may be modified as follows.

For both the cases when TCI-PresentInDCI='Enabled' and TCI-PresentInDCI='Disabled', if the offset between the reception of the DL DCI and the corresponding PDSCH is less than the threshold Threshold-Sched-Offset, the UE may assume that the antenna ports of one DM-RS port group of PDSCH of a serving cell are quasi co-located based on the TCI state used for PDCCH quasi co-location indication of the lowest CORESET-ID in the latest slot prior to the PDSCH in which one or more CORESETs are configured for the UE. If all configured TCI states do not contain 'QCL-TypeD', the UE shall obtain the other QCL assumptions from the indicated TCI states for its scheduled PDSCH irrespective of the time offset between the reception of the DL DCI and the corresponding PDSCH.

Figure 14:
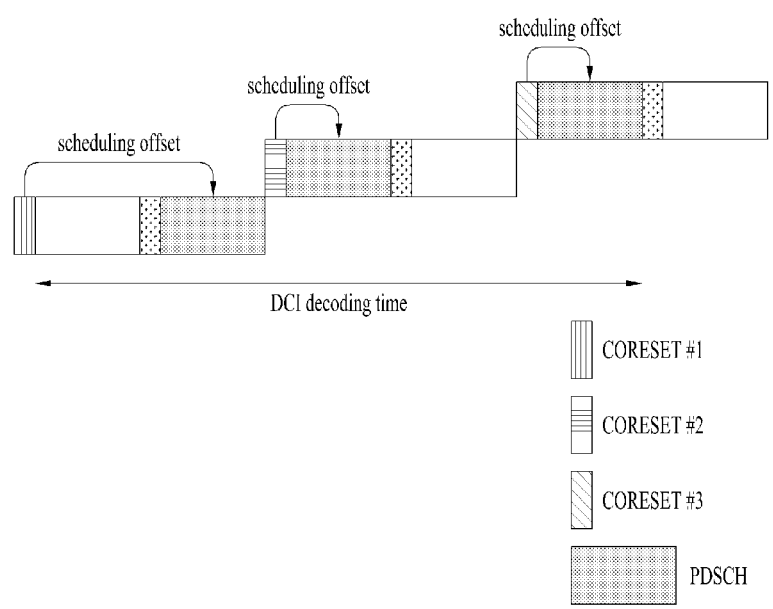

FIG. 14 is a diagram illustrating a fourth example for explaining UE operations related to a plurality of CORE-SETs and PDSCHs related to the plurality of CORESETs according to the present disclosure.

FIG. 14 shows a case in which two different CORESETs are configured/received within Threshold-Sched-Offset (or the DCI decoding time) for CORESET #1.

According to Method 1-2 described above, a UE may receive/buffer PDSCHs received within Threshold-Sched-Offset (or the DCI decoding time) for CORESET #1 as follows and then decode each of the PDSCHs based on detected DCI (for convenience of description, PDSCHs scheduled by CORESET #1, CORESET #2, and CORESET #3 are named PDSCH #1, PDSCH #2, and PDSCH #3, respectively).

Specifically, according to Method 1-2, the UE may assume that the QCL of a DMRS port (or DMRS port group) of PDSCH #1 follows the TCI state of CORESET #1 based on CORESET #1, which is the latest CORESET before PDSCH #1. Based on this assumption, the UE may receive/buffer PDSCH #1. Then, the UE may confirm that PDSCH #1 is present in a received/buffered signal based on detection of DCI in CORESET #1 and then decode PDSCH #1.

Similarly, the UE may assume that the QCL of a DMRS port (or DMRS port group) of PDSCH #2 follows the TCI state of CORESET #2 based on CORESET #2, which is the latest CORESET before PDSCH #2. Further, the UE may assume that the QCL of a DMRS port (or DMRS port group) of PDSCH #3 follows the TCI state of CORESET #3 based on CORESET #3, which is the latest CORESET before PDSCH #3. Based on these assumptions, the UE may receive/buffer PDSCH #2 and PDSCH #3. Then, the UE may confirm that PDSCH #2 and PDSCH #3 are present in received/buffered signals based on detection of DCI in CORESET #2 and CORESET #3 and then decode PDSCH #2 and PDSCH #3.

2.2. Method 2

In Method 2 according to the present disclosure, a case in which a UE receives signals based on a plurality of different TCI states or a plurality of different RX beams will be described.

Figure 15:
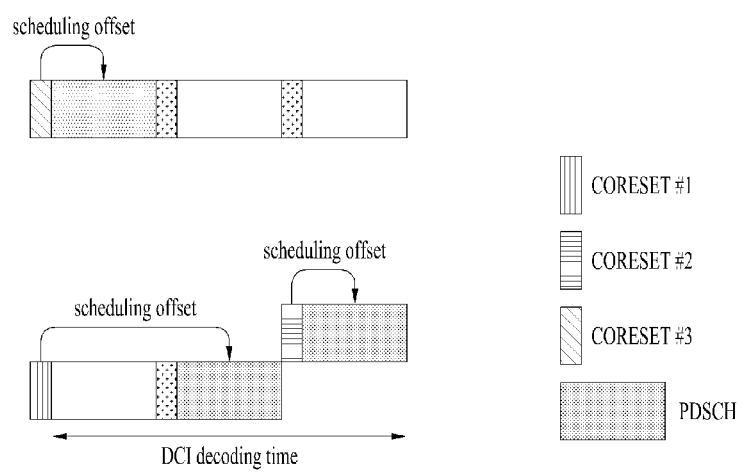

FIG. 15 is a diagram illustrating a fifth example for explaining UE operations related to a plurality of CORE-SETs and PDSCHs related to the plurality of CORESETs according to the present disclosure.

Referring to FIG. 15, if a UE is incapable of simultaneously receiving CORESET #1 and CORESET #3 (for example, if the UE receives a CORESET based on only one TCI state or one Rx beam and TCI states or UE Rx beams corresponding to two CORESETs are different from each other), the UE may receive a CORESET based on the TCI state (or Rx beam) of CORESET #1 with a lower identification number between the two CORESETs and buffer a signal received within the DCI decoding time of the CORE-SET. In this case, the UE may not receive/decode a PDSCH that is scheduled by CORESET #3 and transmitted within the DCI decoding time thereof.

However, unlike the above example, if the UE is capable of simultaneously receiving a plurality of signals based on a plurality of different TCI states or a plurality of different Rx beams, the UE and a BS may operate as follows.

In this case, the UE and BS may transmit and receive UE capability about the maximum number of different TCI states or Rx beams used by the UE for signal reception. In other words, the UE may report to the BS the UE capability about the maximum number of different TCI states or Rx beams the UE is capable of using for signal reception. In the present disclosure, the value of the UE capability is assumed to be N.

As shown in FIG. 15, both a PDSCH scheduled by CORESET #1 (hereinafter referred to as PDSCH #A) and a PDSCH scheduled by CORESET #3 (hereinafter referred to as PDSCH #B) may be scheduled within the DCI decoding time of the UE. In this case, according to the prior art, there is ambiguity that the QCL of a DMRS port (or DMRS port group) of PDSCH #A and/or PDSCH #B follows the TCI state of which CORESET (i.e., either CORESET #1 or CORESET #3) since the two CORESETs (CORESET #1 and CORESET #3) are configured at the same time.

In particular, according to the prior art, the UE may assume that the QCL of the two PDSCHs (PDSCH #A and PDSCH #B) follows the TCI state used for PDCCH QCL indication of CORESET #1. However, in this case, the UE may not correctly receive/decode PDSCH #B.

Figure 16:
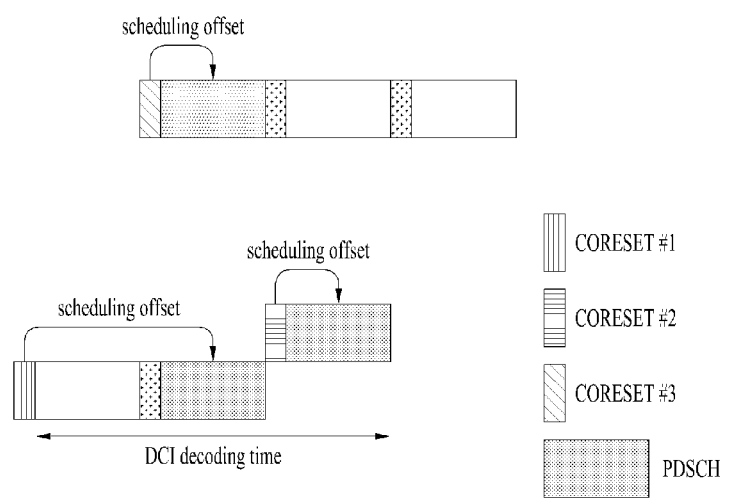

FIG. 16 is a diagram illustrating a sixth example for explaining UE operations related to a plurality of CORE-SETs and PDSCHs related to the plurality of CORESETs according to the present disclosure.

Referring to FIG. 16, a PDSCH scheduled by CORESET #1 (PDSCH #C), CORESET #3, a PDSCH scheduled by CORESET #3 (PDSCH #D), CORESET #2, a PDSCH scheduled by CORESET #2 (PDSCH #E) may be transmitted within the DCI decoding time for CORESET #1. In this case, according to Method 1-2 described above, a UE needs to assume that the QCL of a DMRS port (or DMRS port group) of PDSCH #C follows the TCI state used for PDCCH QCL indication of CORESET #3. The reason for this is that after receiving CORESET #3, the UE expects that the DMRS of a PDSCH received after CORESET #3 is QCLed with an RS included in the TCI state of CORE-SET #3. In this case, the UE may correctly decode PDSCH #C.

2.2.1. Method 2-1

When different CORESETs are configured within Threshold-Sched-Offset (or the DCI decoding time) of a UE as shown in FIGS. 15 and 16, the UE may assume that the QCL of each PDSCH follows the TCI state used for PDCCH QCL indication of the latest CORESET, where the TCI state or UE Rx beam used for receiving the PDSCH is determined. Then, the UE may receive/buffer and detect each PDSCH.

Accordingly, the UE may determine the QCL of the PDSCH depending on UE implementation.

However, in this case, since a BS needs to anticipate the UE implementation and schedule the CORESET based thereon, there may be some difficulties in CORESET scheduling from the perspective of the network.

2.2.2. Method 2-2

In Method 2-2 according to the present disclosure, it is proposed that a plurality of CORESETs are grouped and received. In this case, CORESET groups may be configured such that CORESETs in the same group are not simultaneously received but CORESETs in different groups are simultaneously received.

When a plurality of CORESETs are simultaneously configured, whether the plurality of CORESETs are capable of being simultaneously received or not may be easily determined based on the grouping.

In particular, this method may solve the problem described in Method 2-1 that there are some difficulties in the CORESET scheduling from the perspective of the network.

Specifically, according to Method 2-2, CORESET groups may be defined/configured such that CORESETs in the same group are not simultaneously received based on different TCI states or different UE Rx beams but CORESETs in different groups are simultaneously received based on different TCI states or different UE Rx beams.

The definition/configuration of a CORESET group may be signaled through signaling between a UE and a BS (e.g., PDCCH, DCI, RRC signaling, MAC-CE signaling, or any combinations thereof).

If different CORESETs are configured within Threshold-Sched-Offset (or the DCI decoding time) of a UE, the UE may assume that the QCL of a PDSCH scheduled before the different CORESETs follows the TCI state used for PDCCH QCL indication of a CORESET that is configured (at the latest time) immediately before reception of the PDSCH and belong to the same group as a CORESET scheduling the PDSCH.

In particular, when the reception time of a PDSCH scheduled by CORESET #1 is within the DCI decoding time for CORESET #1 and the reception time of the PDSCH is behind the reception time of CORESET #3, the QCL of the PDSCH assumed by the UE to receive the PDSCH (or a data signal transmitted over the PDSCH) may be determined depending on whether CORESET #3 and CORESET #1 belong to the same CORESET group or not. For example, when the two CORESETs belong to different groups, the UE may receive/decode the PDSCH on the assumption that the QCL of the PDSCH follows the TCI state of CORESET #1. On the other hand, when the two CORESETs belong to the same group, the UE may receive/decode the PDSCH on the assumption that the QCL of the PDSCH follows the TCI state of CORESET #3. In the present disclosure, if a UE is configured with no CORESET group information, the UE may assume that all CORESETs configured for the UE belong to the same group. The number of CORESET groups may be set less than or equal to the value of N, which is reported by the UE.

According to the above-described method, TS 38.214 may be modified as follows.

For both the cases when TCI-PresentInDCI='Enabled' and TCI-PresentInDCI='Disabled', if the offset between the reception of the DL DCI and the corresponding PDSCH is less than the threshold Threshold-Sched-Offset, the UE may assume that the antenna ports of one DM-RS port group of PDSCH of a serving cell are quasi co-located based on the TCI state used for PDCCH quasi co-location indication of the lowest CORESET-ID in the latest slot prior to the PDSCH in which one or more CORESETs, which belong to the same group of CORESET scheduling the PDSCH, are configured for the UE. If all configured TCI states do not contain 'QCL-TypeD', the UE shall obtain the other QCL assumptions from the indicated TCI states for its scheduled PDSCH irrespective of the time offset between the reception of the DL DCI and the corresponding PDSCH.

Assuming that CORESETs #1 and #2 are group #1 and CORESET #3 is group 2 in FIG. 16, the UE according to the present disclosure may operate as follows.

Specifically, based on the fact that CORESET #1 and CORESET #3 belong to different groups, the UE may assume that the QCL of a PDSCH scheduled by CORESET #1 follows the TCI state used for PDCCH QCL indication of CORESET #1 (even though CORESET #3 is the latest CORESET with respect to the PDSCH). Based on this assumption, the UE may receive/buffer the PDSCH scheduled by CORESET #1 and then decode the PDSCH.

Additionally, Method 1-1 or 1-2 described above may be applied to CORESETs in the same group.

Further, although the present disclosure is described based on the configuration in which CORESETs are grouped, the configuration may be extended to a configuration in which CORESETs capable of being simultaneously received and CORESETs incapable of simultaneously received are distinguished from each other by separate identifiers.

Figure 17:
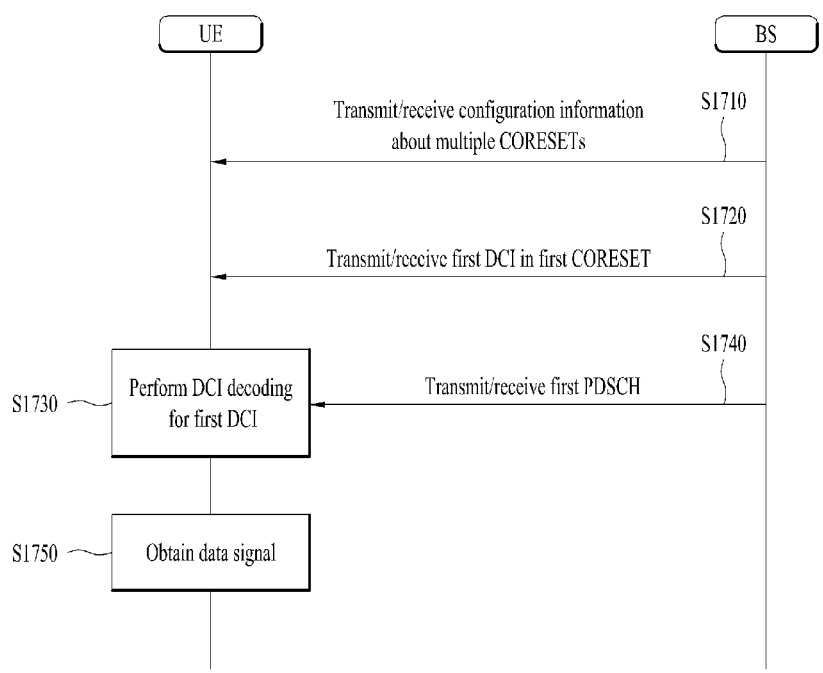
FIG. 17 is a diagram schematically illustrating signal transmission and reception between a UE and a base station (BS) according to an embodiment of the present disclosure.
Figure 18:
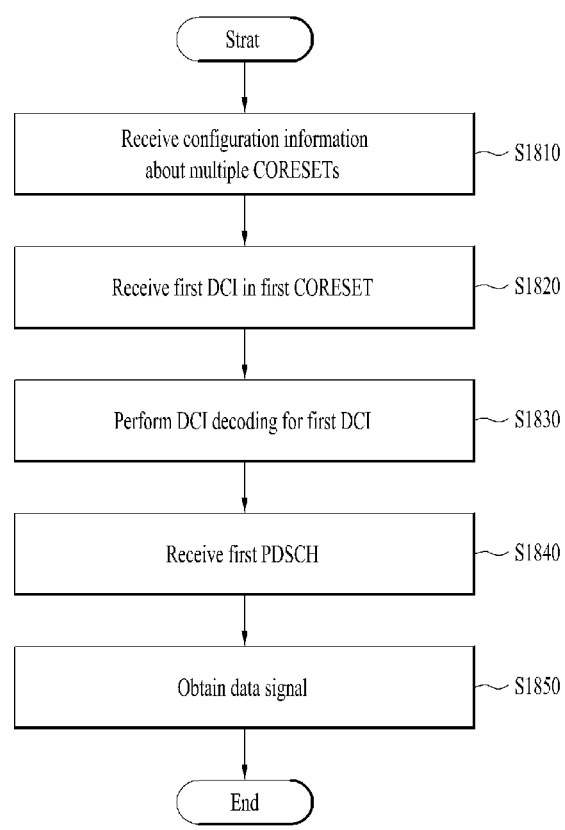
FIG. 18 is a flowchart schematically illustrating the operations of the UE according to the present disclosure.
Figure 19:
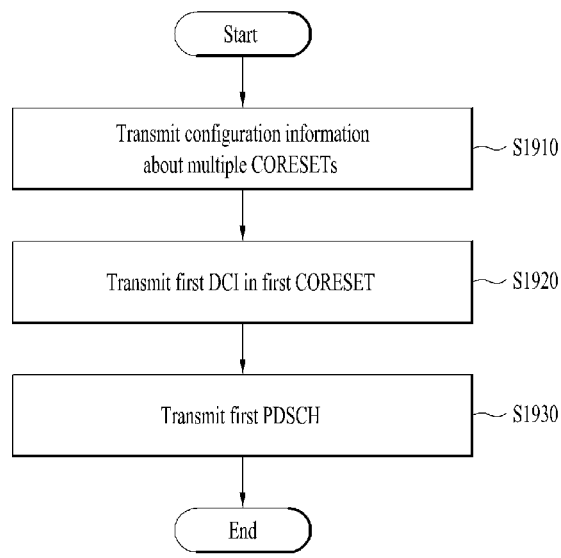
FIG. 19 is a flowchart schematically illustrating the operations of the BS according to the present disclosure.

FIG. 17 is a diagram schematically illustrating signal transmission and reception between a UE and a BS according to an embodiment of the present disclosure, FIG. 18 is a flowchart schematically illustrating the operations of the UE according to the present disclosure, and FIG. 19 is a flowchart schematically illustrating the operations of the BS according to the present disclosure.

The BS transmits configuration information about a plurality of CORESETs to the UE (S1710 and S1910). The UE receives the configuration information about the plurality of CORESETs configured for the UE (S1710 and S1810). In this case, the configuration information may be transmitted and received through higher layer signaling (e.g., RRC).

The UE obtains a data signal from a first PDSCH scheduled by first DCI received in a first CORESET among the plurality of CORESETs.

In particular, when an offset between a first reception time of the first DCI and a second reception time of the first PDSCH is smaller than a prescribed threshold, the UE may obtain the data signal from the first PDSCH by assuming a TCI state used for PDCCH QCL indication related to one CORESET among one or more CORESETs related to the first CORESET in the latest slot before the first PDSCH.

Hereinafter, the operation will be described in detail.

The BS may transmit the first DCI to the UE in the first CORESET among the plurality of CORESETs (S1720 and S1902). The UE may receive the first DCI in the first CORESET among the plurality of CORESETs (S1720 and S1820).

Then, the UE may perform DCI decoding for the received first DCI (S1730 and S1830).

The BS may transmit the first PDSCH scheduled by the first DCI to the UE (S1740 and S1930). For example, the BS may transmit the first PDSCH to the UE while the UE performs the DCI decoding.

The UE may receive the first PDSCH (S1740 and S1840). The first PDSCH reception at the UE may mean that while decoding the first DCI, the UE buffers a signal corresponding to the first PDSCH in an extra buffer. If the UE does not complete decoding of the first DCI at the corresponding time, the UE may buffer the signal corresponding to the first PDSCH only but fail to obtain/decode the data signal scheduled by the first DCI.

Thereafter, after completing the DCI decoding for the first DCI, the UE may obtain the data signal from the first PDSCH signal buffered based on the first DCI (S1750 and S1850). Specifically, when the offset between the first reception time of the first DCI and the second reception time of the first PDSHC is less than the prescribed threshold, the UE may obtain the data signal from the first PDSCH by assuming the TCI state used for the PDCCH QCL indication related to the one CORESET among the one or more CORESETs related to the first CORESET in the latest slot before the first PDSCH.

In the present disclosure, the UE may have a capability of receiving signals simultaneously based on N TCI states, where N may be a natural number greater than 2.

The UE may report information about the capability to the BS.

In the present disclosure, the plurality of CORESETs may include the following CORESETs.
-one or more CORESETs related to the first CORESET
-one or more CORESETs unrelated to the first CORESET For example, the one or more CORESETs related to the first CORESET may be included in the same CORESET group as the first CORESET, and the one or more CORESETs unrelated to the first CORESET may be included in one or more second CORESET groups, which are different from a first CORESET group including the first CORESET. In this case, if the UE has the capability of receiving signals simultaneously based on the N TCI states, the number of CORESET groups included in the plurality of CORESETs may be less than or equal to N.

As another example, the one or more CORESETs related to the first CORESET may be related to the same identifier as the first CORESET, and the one or more CORESETs unrelated to the first CORESET may be related to a different identifier from the first CORESET.

In the above examples, if a second CORESET unrelated to the first CORESET is configured after the first CORESET and before the first PDSCH in the time domain and the one CORESET among the one or more CORESETs related to the first CORESET in the latest slot before the first PDSCH is the first CORESET, the UE may obtain the data signal from the first PDSCH by assuming a TCI state used for PDCCH QCL indication related to the first CORESET rather than the second CORESET.

In particular, when an offset between a third reception time of second DCI received in the second CORESET and a fourth reception time of a second PDSCH scheduled by the second DCI is smaller than the prescribed threshold, the UE may obtain the data signal from the second PDSCH by assuming a TCI state used for PDCCH QCL indication related to one CORESET among one or more CORESETs related to the second CORESET in the latest slot before the second PDSCH.

In the present disclosure, if a third CORESET related to the first CORESET is configured after the first CORESET and before the first PDSCH in the time domain and the one CORESET among the one or more CORESETs related to the first CORESET in the latest slot before the first PDSCH is the third CORESET, the UE may obtain the data signal from the first PDSCH by assuming a TCI state used for PDCCH QCL indication related to the third CORESET rather than the first CORESET.

In the present disclosure, the prescribed threshold may be determined based on configuration information received through higher layer signaling. For example, the prescribed threshold may correspond to a time period for DCI decoding. To this end, the prescribed threshold may be determined based on the capability of the UE, which is reported by the UE. As another example, the prescribed threshold may be randomly configured by the BS.

In the present disclosure, the one CORESET among the one or more CORESETs related to the first CORESET in the latest slot before the first PDSCH may be a CORESET with lowest identification information among the one or more CORESETs related to the first CORESET in the latest slot before the first PDSCH.

Additionally, the UE according to the present disclosure may operate as follows based on the aforementioned operations.

The UE may receive configuration information about a plurality of CORESETs configured for the UE When the UE is capable of receiving signals simultaneously based on a plurality of TCI states, the UE may operate as follows.

The UE may buffer a received first signal by assuming a TCI state used for PDCCH QCL indication related to any one CORESET included in a first CORESET group during a first time period related to decoding of first DCI received in a first CORESET included in the first CORESET group.

The UE may buffer a received second signal by assuming a TCI state used for PDCCH QCL indication related to any one CORESET included in a second CORESET group during a second time period related to decoding of second DCI received in a second CORESET included in the second CORESET group Then, the UE may obtain the data signal from at least one of the first signal or the second signal based on at least one of a first PDSCH scheduled by the first DCI during the first time period or a second PDSCH scheduled by the second DCI during the second time period.

When one or more third CORESETs included in the first CORESET group are configured after the first CORESET within the first time period, the any one CORESET included in the first CORESET group may be determined as follows depending on time.

For example, if the any one CORESET is before the one or more third CORESETs, the any one CORESET is determined as the first CORESET.

As another example, if the any one CORESET is after the one or more third CORESETs, the any one CORESET is determined as the latest CORESET among the one or more third CORESETs.

Since each of the examples of the proposed methods may be included as one method for implementing the present disclosure, it is apparent that each example may be regarded as a proposed method. Although the proposed methods may be implemented independently, some of the proposed methods may be combined (or merged) for implementation. In addition, it may be regulated that information on whether the proposed methods are applied (or information on rules related to the proposed methods) should be transmitted from a BS to a UE through a predefined signal (e.g., a physical layer signal, a higher layer signal, etc.).

3. Device Configurations

Figure 20:
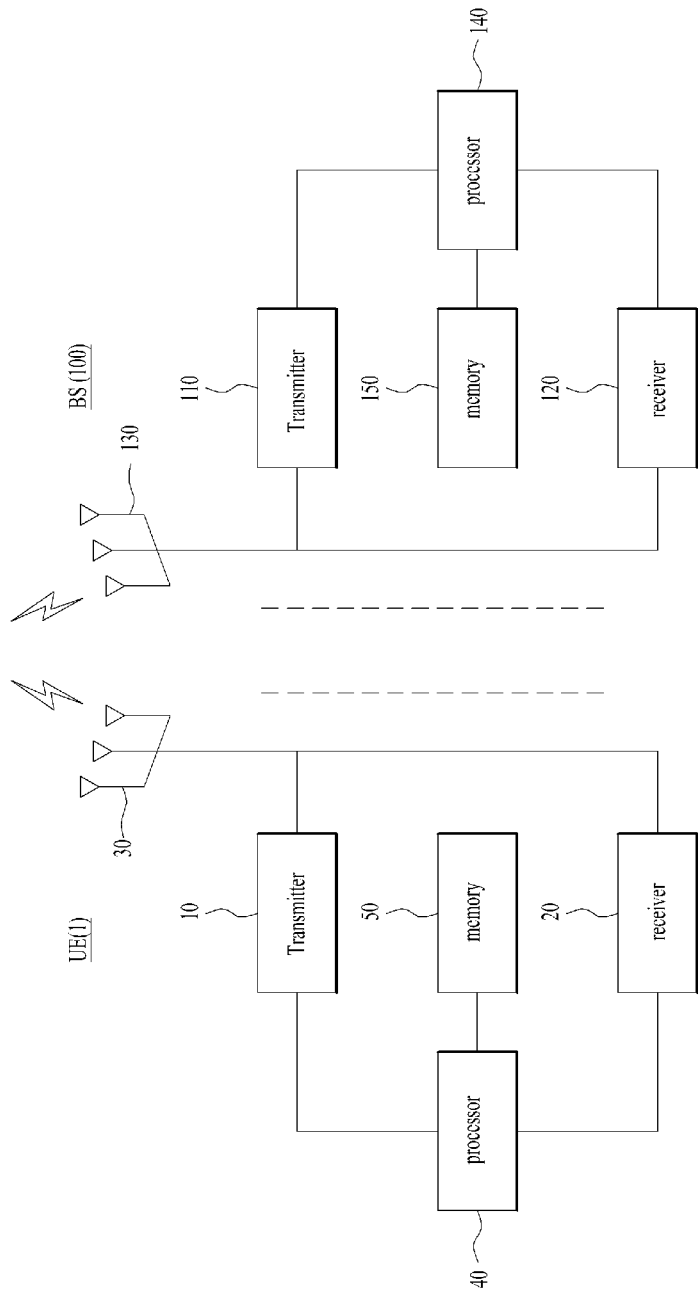
FIG. 20 is a block diagram illustrating the configurations of a UE and a BS for implementing the proposed embodiments.

FIG. 20 is a block diagram illustrating the configurations of a UE and a BS for implementing the proposed embodiments. The UE and BS illustrated in FIG. 20 operate to implement the aforementioned embodiments of the data signal transmission method therebetween.

The UE 1 may act as a transmission end in UL and act as a reception end in DL. The BS (eNB or gNB) 100 may act as a reception end in UL and act as a transmission end in DL.

Each of the UE and BS may include a transmitter 10/110 and a receiver 20/120 for controlling transmission and reception of information, data, and/or messages and an antenna 30/130 for transmitting and receiving information, data, and/or messages.

In addition, each of the UE and BS may include a processor 40/140 for implementing the above-described embodiments of the present disclosure. The processor 40/140 may be configured to control a memory 50/150, the transmitter 10/110, and/or the receiver 20/120 to implement the foregoing described/proposed procedures and/or methods.

For example, the processor 40/140 may include a communication modem designed to implement wireless communication technologies (e.g., LTE, NR, etc.). The memory 50/150 may be coupled to the processor 40/140 and store various information related to operations of the processor 40/140. For example, the memory 50/150 may store software code including instructions for performing all or some of the processes controlled by the processor 40/140 or the above-described/proposed procedures and/or methods. The transmitter 10/110 and/or the receiver 20/120 may be coupled to the processor 40/140 and transmit and/or receive a radio signal. The processor 40/140 and the memory 50/150 may be parts of a processing chip (e.g., system on chip (SoC)).

The transmitter and receiver included in the UE and BS may perform packet modulation/demodulation for data transmission, high-speed packet channel coding, OFDMA packet scheduling, time division duplex (TDD) packet scheduling, and/or channel multiplexing. Each of the UE and BS of FIG. 20 may further include a low-power radio frequency/intermediate frequency (RF/IF) module.

Figure 21:
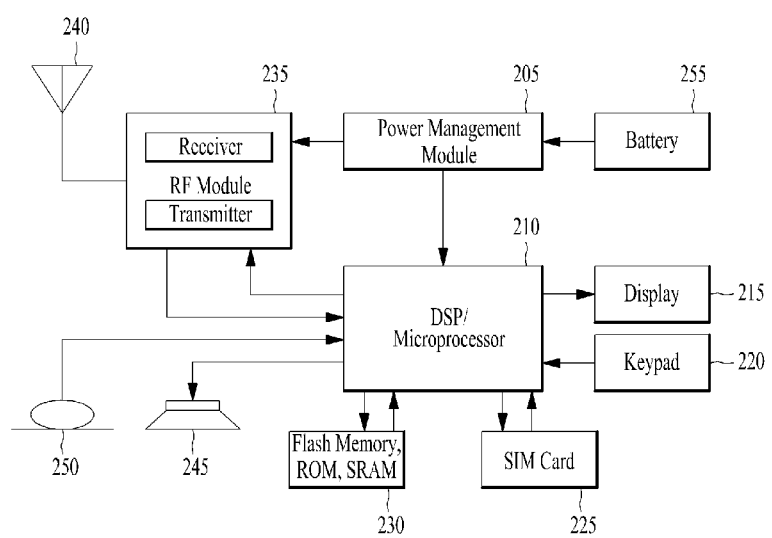
FIG. 21 is a block diagram illustrating a communication device for implementing the proposed embodiments.

FIG. 21 is a block diagram illustrating a communication device for implementing the proposed embodiments.

The device shown in FIG. 21 may be a UE and/or a BS (e.g., eNB or gNB) configured to perform the above-described mechanism or any device configured to perform the same operation.

As shown in FIG. 21, the device may include a digital signal processor (DSP)/microprocessor 210 and an RF module (transceiver) 235. The DSP/microprocessor 210 is electrically connected to the transceiver 235 and controls the transceiver 235. The device may further include a power management module 205, a battery 255, a display 215, a keypad 220, an SIM card 225, a memory device 230, a speaker 245, and an input device 250 depending on designer's choice In particular, the device shown in FIG. 21 may be a UE including a receiver 235 configured to receive a request message from a network and a transmitter 235 configured to transmit information about transmission and reception timings to the network. The receiver and transmitter may be implemented as a transceiver 235. The UE may further include a processor 210 connected to the transceiver 235 (transmitter and receiver).

In addition, the device shown in FIG. 21 may be a network device including a transmitter 235 configured to transmit a request message to a UE and a receiver 235 configured to receive information about transmission and reception timings from the UE. The transmitter and receiver may be implemented as a transceiver 235. The network device may further include a processor 210 connected to the transmitter and receiver. The processor 210 may be configured to calculate latency based on the information about the transmission and reception timings.

According to the present disclosure, the processor of a UE (or a communication device included in the UE) may operate as follows by controlling a memory.

According to the present disclosure, the UE may include at least one RF module; at least one processor; and at least one memory operably connected to the at least one processor and storing instructions that, when executed, cause the at least one processor to perform the following operations. The communication device included in the UE may be configured to include the at least one processor and the at least one memory. The communication device may include or may not include the at least one RF module. In the latter, the communication device may be configured to be connected to the at least one RF module.

The processor of the UE (or processor of the communication device included in the UE) may be configured to receive configuration information about a plurality of CORESETs configured for the UE by controlling the at least one RF module and obtain a data signal from a PDSCH scheduled by DCI received in a first CORESET among the plurality of CORESETs. When an offset between a first reception time of the DCI and a second reception time of the PDSCH is smaller than a prescribed threshold, the at least one processor may be configured to obtain the data signal from the PDSCH by assuming a TCI state used for PDCCH QCL indication related to one CORESET among one or more CORESETs related to the first CORESET in the latest slot before the PDSCH.

Meanwhile, the UE may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MBS) phone, a hand-held PC, a laptop PC, a smart phone, a multi-mode multi-band (MM-MB) terminal, etc.

The smart phone is a terminal taking the advantages of both a mobile phone and a PDA. It incorporates the functions of a PDA, that is, scheduling and data communications such as fax transmission and reception and Internet connection into a mobile phone. The MB-MM terminal refers to a terminal which has a multi-modem chip built therein and which can operate in any of a mobile Internet system and other mobile communication systems (e.g. CDMA 2000, WCDMA, etc.).

Embodiments of the present disclosure may be achieved by various means, for example, hardware, firmware, software, or a combination thereof.

In a hardware configuration, the methods according to exemplary embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the embodiments of the present disclosure may be implemented in the form of a module, a procedure, a function, etc. performing the above-described functions or operations. A software code may be stored in the memory 50 or 150 and executed by the processor 40 or 140. The memory is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The present disclosure is applicable to various wireless access systems including a 3GPP system, and/or a 3GPP2 system. Besides these wireless access systems, the embodiments of the present disclosure are applicable to all technical fields in which the wireless access systems find their applications. Moreover, the proposed method can also be applied to mmWave communication using an ultra-high frequency band.

The invention claimed is:

1. A method of receiving a Physical Downlink Shared Channel (PDSCH) by a user equipment (UE) in a wireless communication system, the method comprising:
receiving configuration information related to a plurality of Control Resource Set (CORESET) pools for a plurality of CORESETs;
receiving a Physical Downlink Control Channel (PDCCH) through a first CORESET associated with a CORESET pool among the plurality of CORESET pools; and
receiving, in a first slot, the PDSCH based on the first PDCCH;
wherein, based on an offset between a reception time of the PDSCH and a reception time of Downlink Control Information (DCI) on the PDCCH being less than a threshold, the PDSCH is received based on a quasi co-location (QCL) parameter related to a second CORESET, which is associated with the same CORESET pool as the first CORESET, in a latest slot of the first slot among at least one second slot,
wherein the at least one second slot includes one or more CORESETs associated with the same CORESET pool as the first CORESET,
wherein the plurality of CORESET pools include the first CORESET pool and a second CORESET pool different from the first CORESET pool, and
wherein the first CORESET pool has a first index, and the second CORESET pool has a second index different from the first index.

2. The method of claim 1, wherein the UE has a capability of receiving signals simultaneously based on N TCI states, where N is a natural number greater than 2.

3. The method of claim 2, further comprising reporting information about the capability to a base station.

4. The method of claim 1, wherein the second CORESET has a lowest identifier among the one or more CORESETs.

5. The method of claim 1,
wherein information related to the threshold is received through higher layer signaling.

6. A user equipment (UE) configured to receive a Physical Downlink Shared Channel (PDSCH) in a wireless communication system, the UE comprising:
at least one processor; and
at least one memory operably connected to the at least one processor and storing instructions that, when executed, cause the at least one processor to perform operations comprising:
receiving configuration information related to a plurality of Control Resource Set (CORESET) pools for a plurality of CORESETs;
receiving a Physical Downlink Control Channel (PDCCH) through a first CORESET associated with a CORESET pool among the plurality of CORESET pools; and
receiving, in a first slot, the PDSCH based on the first PDCCH;
wherein, based on an offset between a reception time of the PDSCH and a reception time of the Downlink Control Information (DCI) being less than a threshold, the PDSCH is received based on a quasi co-location (QCL) parameter related to a second CORESET, which is associated with the same CORESET pool as the first CORESET, in a latest slot of the first slot among at least one second slot,
wherein the at least one second slot includes one or more CORESETs associated with the same CORESET pool as the first CORESET,
wherein the plurality of CORESET pools include the first CORESET pool and a second CORESET pool different from the first CORESET pool, and
wherein the first CORESET pool has a first index, and the second CORESET pool has a second index different from the first index.

7. The UE of claim 6, wherein the second CORESET has a lowest identifier among the one or more CORESETs.

* * * * *